United States Patent [19]
Strauss et al.

[11] 3,842,587
[45] Oct. 22, 1974

[54] ELECTRICALLY CONTROLLED PHOTOGRAPHIC CAMERA

[75] Inventors: Karl-Peter Strauss; Wilhelm Koller, both of Braunschweig, Germany

[73] Assignee: Rollei-Werke Franke & Heidecke, Braunschweig, Germany

[22] Filed: Feb. 13, 1974

[21] Appl. No.: 442,261

Related U.S. Application Data

[63] Continuation-in-part of Ser. No. 386,379, Aug. 7, 1973.

[30] Foreign Application Priority Data

Aug. 19, 1972 Germany...................... 2240920
Nov. 13, 1973 Germany...................... 2356523
Nov. 13, 1973 Germany...................... 2356530

[52] U.S. Cl. .............................................. 354/30
[51] Int. Cl. ........................................... G03b 7/00
[58] Field of Search ................. 354/29, 30, 26, 267

[56] References Cited
UNITED STATES PATENTS

| | | | |
|---|---|---|---|
| 3,528,350 | 9/1970 | Schmitt................................ | 354/29 |
| 3,641,891 | 2/1972 | Burgarella........................ | 354/30 X |

*Primary Examiner*—Samuel S. Matthews
*Assistant Examiner*—Michael L. Geliner
*Attorney, Agent, or Firm*—Stonebraker & Shepard

[57] ABSTRACT

A still camera in which the various functions are controlled electrically rather than mechanically. A step-by-step switch is connected to a pulse generator in such manner that each pulse advances the step-by-step switch through one step. Each step position of the switch controls one function of the camera, such as, for example (in the case of a single lens mirror reflex camera) the respective functions of swinging the mirror to viewing position, opening the diaphragm for viewing, determining a proper diaphragm setting according to the prevailing light conditions, compensating for stray light, closing the shutter, swinging the shutter from viewing position to picture taking position, opening the shutter for starting the actual exposure, closing the shutter when the exposure is completed, transporting the film, etc. When a series of pictures is to be taken in rapid succession at the same diaphragm setting and shutter speed setting, provision is made for by-passing some of the steps, to save the time that would be required for performing functions which are unnecessary when a rapid sequence of "serial" pictures are to be taken.

61 Claims, 12 Drawing Figures

| German Symbol | American Symbol | Designation | Function Table |
|---|---|---|---|
|  |  | AND | $E_1$ $E_2$ $A$<br>0 0 0<br>0 1 0<br>1 0 0<br>1 1 1 |
|  |  | OR | $E_1$ $E_2$ $A$<br>0 0 0<br>0 1 1<br>1 0 1<br>1 1 1 |
|  |  | NAND | $E_1$ $E_2$ $A$<br>0 0 1<br>0 1 1<br>1 0 1<br>1 1 0 |
|  |  | NOR | $E_1$ $E_2$ $A$<br>0 0 1<br>0 1 0<br>1 0 0<br>1 1 0 |
|  |  | Inverter | $E$ $A$<br>0 1<br>1 0 |

ELECTRICALLY CONTROLLED PHOTOGRAPHIC CAMERA

CROSS REFERENCE TO RELATED APPLICATION

This application is a continuation-in-part of application Ser. No. 386,379, filed Aug. 7, 1973, for Photographic camera control means, now pending.

BACKGROUND OF THE INVENTION

The present invention relates to a still camera in which various different functions are controlled electrically, before and during an exposure and during the cocking or tensioning of the camera after the exposure.

In one known form of electrically controlled still camera, disclosed in German published patent application (Offenlegungsschrift) 2,141,943, published Mar. 2, 1972, and in U.S. Pat. No. 3,710,700 of Nakano, granted Jan. 16, 1973, there is an electronic diaphragm shutter and an automatic exposure circuit provided with a control device which controls the course of exposure and shutter release in accordance with a predetermined program. When the control device is turned on by operating the release button of the camera, a mechanical control member starts in operation, and results in various functions in individual switch stages.

Thus in the first stage, in this prior construction, when the exposure control circuit is placed in operation, it determines the required diaphragm aperture or stop value by means of an EE measurement. At the same time, stop members are so adjusted in accordance with the diaphragm stop determined that the shutter blades can open only up to this value of stop, and upon reaching this position, they are held fast by a lock which is released by an electrical signal.

In the next stage, the control member connects the drive mechanism of the shutter blades so that they open to the preset diaphragm value. At the same time, the control member switches the exposure control circuit from the manner of operation for setting the diaphragm stop to the manner of operation for determining the exposure time.

Thereupon the drive members are released for the closing of the shutter blades and in response to a signal of the exposure control circuit they bring about the closing movement of the shutter blades.

By turning the control member back after the exposure of the film with simultaneous cocking of the shutter, the control device is again so pre-programmed that the program steps described above are carried out in the same manner when the control member is again released.

Such mechanical control devices have the disadvantage that due to their moments of inertia, they operate with undesired starting and delay times, that they take up a good deal of space, and that when a large number of pictures have been taken, phenomena of wear and thus disturbances occur.

With the mechanical control device described above, the process of the taking of a photograph will always proceed in the same manner upon the actuation of the release. No change in the control program is possible without replacing the entire control device by a different one.

An object of the present invention is therefore to create a still camera in which all processes necessary for the taking of a photograph and which takes place upon the placing in operation of individual parts of the camera are electronically interrelated and logically controlled in accordance with an easily replaceable program which can be varied by pre-selection, in which connection all processes can be broken off, suspended, jumped over, or repeated as desired.

This object is achieved by a central electronic process controller which contains a step-by-step switch which is provided with a plurality of outputs and which can be controlled in such a manner that in each case one output can be fed an electric signal which differs from the other outputs and which has a control and program part which is fed-back with the step-by-step switch and into which there can be introduced all instantaneous values which signal the condition of operation of individual camera elements, the outputs of the step-by-step switch being connected indirectly via the control and program part and/or directly with the individual camera elements.

By the camera of the invention, not only are all the disadvantages described above eliminated, but in addition the advantage of the invention resides in particular in the fact that the previously complicated gear connection between the camera parts participating in the taking of a photograph are done away with and replaced by an electronic connection which is substantially easier to realize and in which exclusively prefabricated components are used. This in its turn makes possible an easy and cheap conversion and modification of the functional interaction of the individual camera parts, and therefore a simple and inexpensive modification of an exposure program which has once been selected if the need for this should arise after a certain amount of time.

In photography it is frequently desired to expose a picture several times with high shutter speed while retaining the same exposure values in order in this way, for instance, to photograph a course of movement in its individual phases of movement on a picture.

Another object of the invention is accordingly so to improve an electronically controlled camera such as disclosed in the above-mentioned application no. 386,379 or in FIGS. 1–9 of the drawings of the present application that, in addition to the regular programmed course of the taking of a picture, the possibility of multiple exposures of a picture is provided by the simple actuating of a selector key, it being seen to it in particular that the existing switch circuit need not be modified or redesigned, but simply supplemented by simple means.

This object is achieved in accordance with the present invention in the manner that switch means which interrupt the predetermined carrying out of the program for the taking of a picture after the closing of the shutter, which terminates the exposure of the film are provided as well as an additional controller which can be connected after said interruption and which effects a determinable number of repetitions of the actual film-exposure cycle while retaining the exposure values initially set.

Up to now two types of multiple exposure of films are known in traditional cameras: in cameras which have a shutter cocking which is separate from the transport of the film, multi-exposure could be effected in simple manner by renewed cocking and release of the shutter without actuation of the film transport. This type of multi-exposure was, however, unsuitable for the photographing of movements which take place relatively rapidly. Furthermore, the danger of blurring of the picture was very great due to the continuous cocking and release of the shutter. In another method, the shutter was open for a long time and the flash sequence of an automatic flash device illuminated the object to be photographed. This method which operates excellently in darkened rooms fails, however, in daylight pictures. Furthermore, this method is also only suitable for movements of medium speed, since the electron flashes obtainable at the present time on the market supply a flash sequence of at most 3 flashes per second, and even this only when the camera is only a slight distance from the object being photographed.

In contradistinction to this, the present invention has the advantage that multi-exposures can be taken with it in daylight and with very high frequency (50 exposures per second). Furthermore, no flash apparatus is necessary, and blurring of the pictures is excluded due to the complete absence of any operating of the individual exposure processes after the actuation of the multi-exposure selector button. As a result of the complete freedom from manual operation, there is also the possibility of having any courses of motion photographed completely automatically by the camera without requiring the presence of the photographer.

As a further development of the invention, the interruption of the course of the program of the taking of a picture can be eliminated by the supplementary controller after a predetermined number of repetitions of the film-exposure cycle. In this way the further program takes place so that the camera, after the turning off of the film transport and the swinging back of the mirror into its viewing position, as well as the opening of the shutter and of the diaphragm, is again ready to take a picture.

In accordance with the invention, the supplementary controller which can be actuated via the control line for the film-transport motor by the step-by-step switch has a pulse generator which can be connected during said actuation and a pulse counter which is provided with a plurality of outputs which can be actuated one after the other, corresponding to the number of pulses. The output of the pulse counter which corresponds to the desired number of pulses is connected with the switch means for the interrupting of the course of the program and disconnects same upon its actuation.

These switch means, in accordance with a further development of the invention, have two transistors connected in series via the multi-exposure selector switch to the current supply of the camera, and when the multi-exposure selector switch is connected, the continuously conducting first transistor can be blocked via the pulse counter output and the second transistor can be driven via the film-transport control line. In this connection, with the blocking of the first transistor, the interruption of the course of the program of the taking of the picture is eliminated, and the pulse generator short circuited.

As a further addition of the invention, the supplementary controller contains a second pulse generator whose output is connected with the clock input of the step-by-step switch, the number of pulses given off in rapid sequence being equal to the switch stages to be passed through in the step-by-step switch from the start of the course of the program of the taking of a picture until the actuation of the shutter-opening drive for the introduction of the exposure of the film. Since the instantaneous condition of the camera parts which are to be actuated in these switch stages — such as diaphragm setting and mirror elevating, already corresponds to their desired condition, the individual switch stages can be gone through substantially faster with the aid of the second pulse generator than normally takes place in the step-by-step switch under the influence of its pulse generator, and thus the number of possible exposures per unit of time would be substantially increased. As compared with an exposure frequency of 20 cycles, an increase in the exposure frequency of up to more than 50 cycles is possible with the aid of this second pulse generator.

DESCRIPTION OF THE PREFERRED EMBODIMENTS

Figure 1:
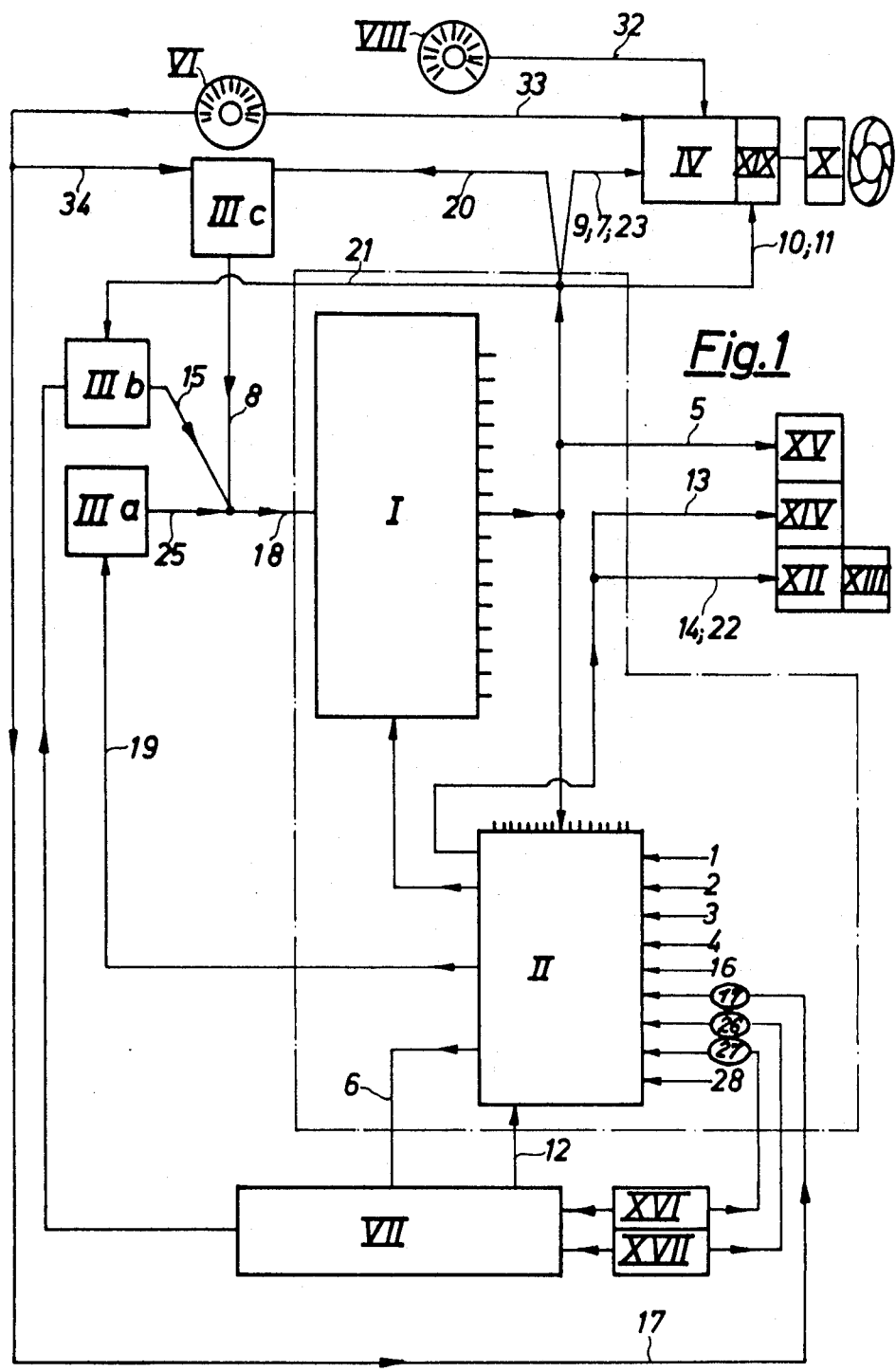
FIG. 1 is a schematic block diagram of the controls for a camera in which the shutter time or speed is preselected and the diaphragm aperture is adjusted automatically.

FIG. 1 shows the diagram of the information flow of the camera with an automatic diaphragm setting mechanism. The individual camera parts and function units are designated by Roman numerals, the control and instantaneous-value input lines connecting the function units are designated with Arabic numbers and placed within circles in the further FIGS. 3 to 9. The arrows indicate the direction of the information flow between the individual function units.

The heart of the circuit is a step-by-step switch I and a control and program part II. The step-by-step switch I which is obtainable as an integrated component on the market consists of the counters A, B, C, and D, and the decoder having 16 outputs which can be occupied one after the other by a signal by clocks of the step-by-step switch. The step-by-step switch operates in accordance with the dual system and is advanced step by step by pulses which arrive over the control input line 18 at its clock input, the next folloiwng ouptut in each case being activated. The four counters A, B, C, and D have a clear or reset zero input over which they can be set back to their initial position. If all clear inputs are activated, the step-by-step switch I is placed back into its starting position in which the zero output is activated. The counters C and D, also each have a so-called preset input by the activation of which the step-by-step switch is enabled to jump over several switch steps. For example, by applying a zero signal to the preset input of the counter C, the step-by-step switch is placed from the switch step one, bypassing the switch steps two and three, directly at the switch step four.

Figure 10:
FIG. 10 is a chart explaining the switch symbols used in the logic wiring diagram, FIGS. 3 and 4, the corresponding American and German symbols both being shown, together with their meaning.
Figure 10:
Figure 10:
Figure 10:
Figure 10:
Figure 10:
Figure 10:
Figure 10:
Figure 10:
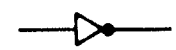
Figure 10:
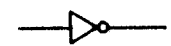

The outputs of the step-by-step switch I are connected either directly or via the control and program part II with the individual camera parts or the individual function units. The control and program part II consists of different logic connecting elements AND, OR, NAND, NOR which process the signals entering via the instantaneous-value input lines in accordance with the exposure program selected and feed them to the output lines at the control and program part where they pass via the corresponding control lines to the individual function units or camera elements. The symbols of the connecting elements are shown in FIG. 10 in accordance with German and American standards and their manner of operation is readily clear from the function table associated with each of them. Therein E indicates the inputs and A the output of the corresponding connecting element. 0 and 1 show the value of the corresponding input and/or output, 0 being equal to logic 0 and 1 equal to logic 1. For example, the output of an AND member only has the value logic 1 when both inputs have the value logic 1; in other words, at the output of an AND member, a signal will occur only if both inputs are activated. If in each case only one or no input is activated, then the output of the final member has the value logic 0.

Figure 5:
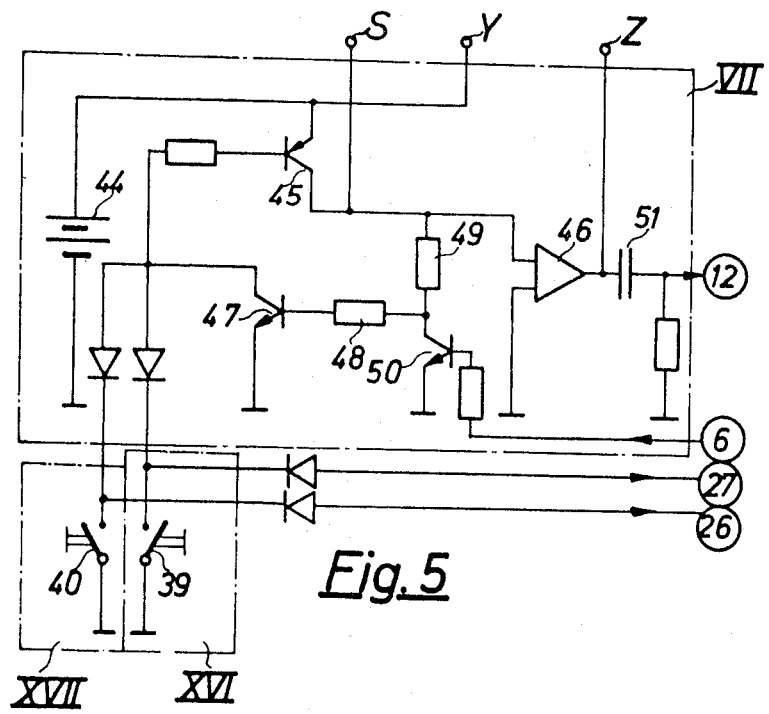
FIG. 5 is a wiring diagram of the voltage supply schematically indicated by the rectangle VII in FIGS. 1 and 2.

FIG. 5 shows the electrical circuit of the current supply device VII of the camera together with the release key XVI and the measurement key XVII. The voltage of the battery 44 is connected to the output Y of the current supply device. The switched battery voltage of 10 volts can be taken off at the output S only when the measurement key or the release is actuated and thus the contact 40 or the contact 39 is closed. In this case, the thyristor 45 becomes conductive and output S is connected with the battery 44. At the same time, furthermore, the switched battery voltage is reduced via a 5-volt stabilizer 46 to 5 volts at the output of the stabilizer. The output of the stabilizer 46 is connected with the output Z of the current supply device VII. With the closing of the contact 40 or 39, a negative pulse occurs in the control lines 26 27, or in other words, the control lines 26, 27 in this case have the value logic 0. Upon the closing of the switch 40 or 39, a positive pulse furthermore occurs in the control line 12, i.e., the control line has the value logic 1. The contacts 40 and 39 after their closing are bridged over by the conductive transistor 47 which forms a so-called self-holding circuit with the resistors 48 and 49 and which can be blocked by activating the transistor 50 via the control line 6 in order to disconnect the current supply.

Figure 6:
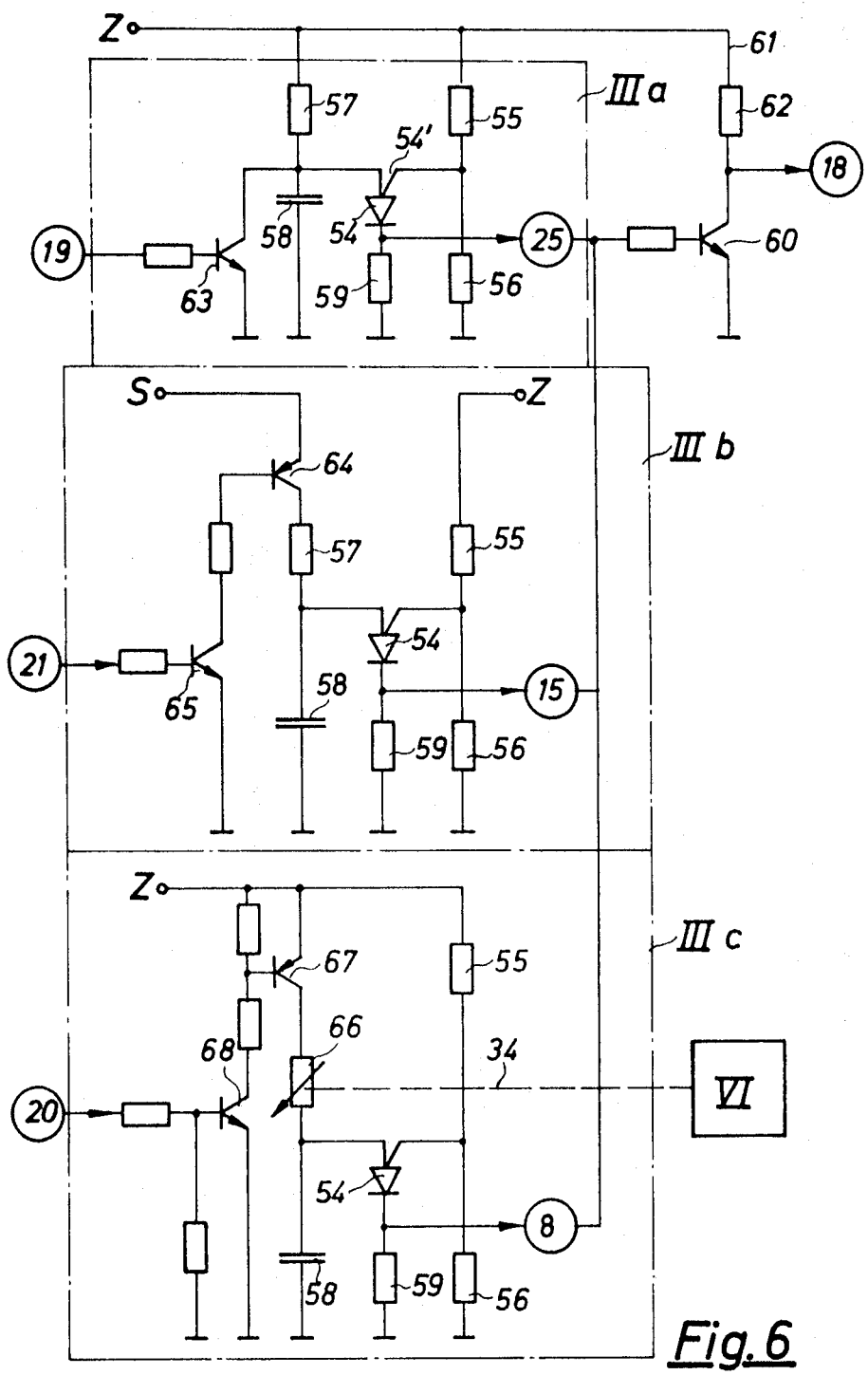
FIG. 6 is a wiring diagram for the control-pulse generators IIIa and IIIb schematically shown by rectangles in FIGS. 1 and 2, and the time-formation generator IIIc schematically shown by a rectangle in FIG. 1.

FIG. 6 shows one possible construction of the control pulse generators III, namely the control pulse generator IIIa for the advancing of the step-by-step switch at a time interval of, for instance, 10 milliseconds, the control pulse generator IIIb which has the object of counteracting the different starting times of the shutter opening device caused by the battery voltage loss and which, instead of the control pulse generator IIIa, advances the step-by-step switch to call for the exposure time, and the time forming generator IIIc which is connected with the start of the actual exposure and after the preselected exposure time moves the step-by-step switch further by one switch step via its control line 8 and the control line 18.

The control pulse generators are of known construction and substantially the same. Their heart consists of a programmable unijunction transistor (PUT) 54 whose anode gate 54' is connected to a voltage divider circuit 55, 56 which in its turn is connected with the output Z of the current supply device VII. The anode of the PUT 54 is connected at the center tap of an RC member 57, 58, (resistor 57 and capacitor 58), while the cathode is at zero potential via a resistor 59. The PUT 54 strikes when the voltage at the capacitor exceeds the voltage at the anode gate 54' of the PUT by about 0.6 volt.

Figure 3:
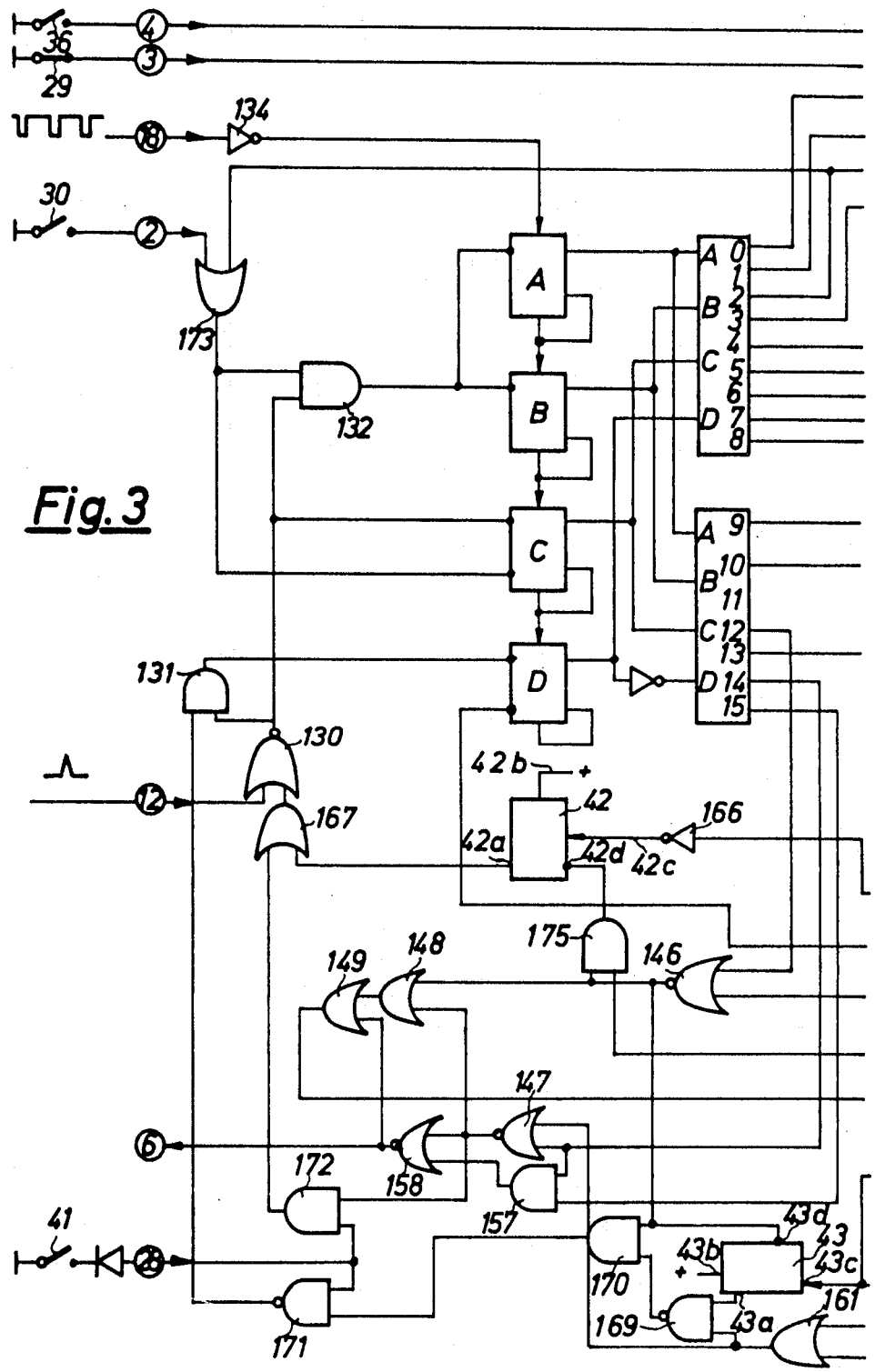
FIGS. 3 and 4 together form a wiring diagram of the logic circuits for the control portions outlined by dot-dash lines in FIGS. 1 and 2, FIG. 3 constituting the left hand half and FIG. 4 the right hand half of the wiring diagram.

The capacitor 58 discharges over the PUT 54 and a pulse-like voltage is produced at the resistor 59 and applied via the control line 25, 15 and 8 to the base of a transistor 60. The transistor 60 is driven and for the time that it is conductive, a positive pulse is present via the control line 18 and the inverter 134 (FIG. 3) on the clock input of the step-by-step switch I. The width of the positive pulse is determined by the discharge time of the capacitor 58. If the capacitor has discharged to such an extent that its discharge current drops below the holding current of the PUT 54, then the PUT blocks and the clock input of the step-by-step switch receives the value logic zero via the current line 61 connected to the output Z of the current supply device VII, the resistor 62 and the inverter 134 (FIG. 3). As soon as the capacitor 58 is again charged to the above-mentioned voltage, the PUT strikes through and the process is repeated. The pulse spacing is determined by the dimensioning of the resistor 57 and of the capacitor 58. The control pulse generator IIIa can be disconnected by means of the transistor 63 connected in parallel to the capacitor 58 in the manner that the transistor is driven by a positive pulse over the control line 19.

In the case of the control pulse generator IIIb, the charging of the capacitor 58 does not take place via the connection Z of the current supply device VII, but via the connection S (10 volts connected) with the interposition of a transistor 64. The charge time of the capacitor is so selected that at full battery voltage it corresponds to the time which is necessary for the bringing of the shutter from the closed position into the open position. The amount of voltage at the output S which, in contradistinction to the stabilized voltage at the output Z, can vary corresponding to the battery voltage losses, thus determines the charge time of the capacitor 58. Since the shutter drive is also fed from the non-stabilized voltage, a possible drop in voltage at the output S or Y of the voltage supply device VII delays the opening of the shutter and at the same time effects a delay in the charging of the capacitor 58. Due to the fact that the control pulse generator IIIb takes over the advancing of the step-by-step switch after the opening of the shutter to the position " call of exposure time," assurance is provided that the exposure time is furnished only when the shutter starts to open. The control pulse generator IIIb is connected via the control line 21. This is effected by bringing the transistor 65 into the conductive state, its collector-emitter path connecting the base of the PNP transistor 64 with the zero potential.

In the time-forming generator IIIc, the fixed resistor 57 is replaced by a variable resistor 66 which can be actuated via the time setting line 34 from the time setting device VI. The charge time of the capacitor 58 determines the exposure time. The time forming generator is started by the bringing into the conductive state of the transistor 67 which lies in series with the resistor 66 and the capacitor 58 and the base of which is connected with the collector-emitter path of a PNP transistor 68. The transistor 68 is driven by the occurrence of a positive pulse in the control ine 20 and thus causes the transistor 67 to become conductive.

Figure 7:
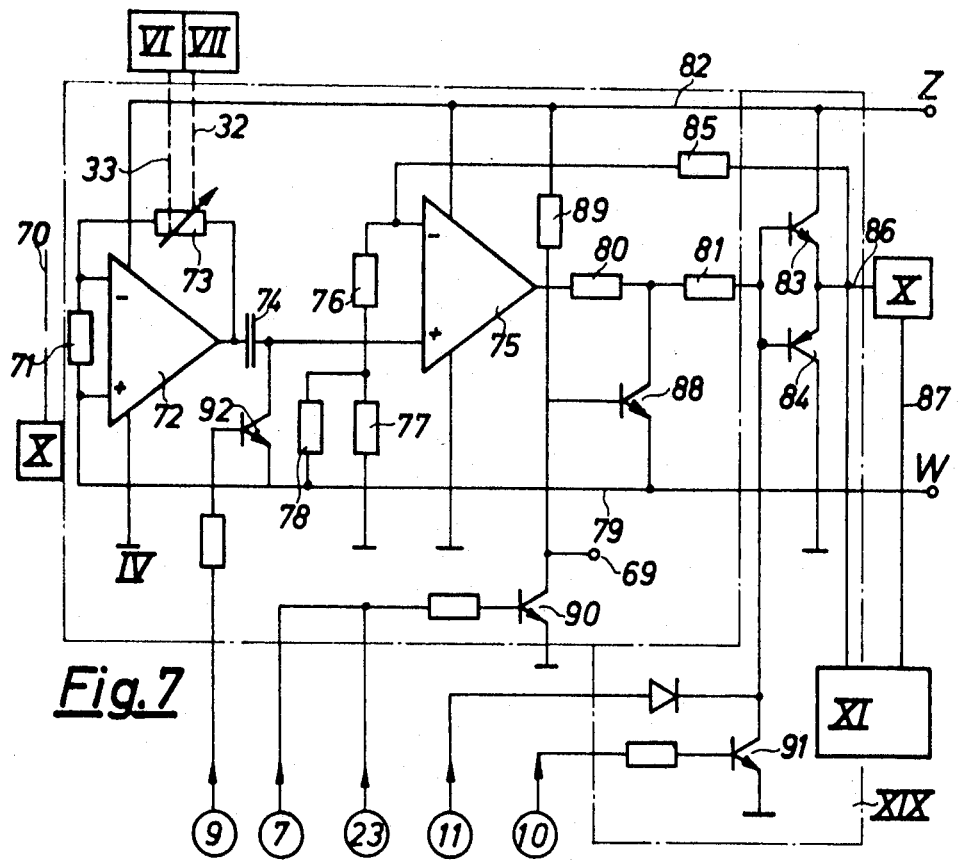
FIG. 7 is a wiring diagram for the automatic diaphragm setting mechanism schematically shown by the rectangle IV in FIG. 1.

FIG. 7 shows the diagram of the automatic diaphragm setting mechanism IV. Via the opened diaphragm, it measures the object luminous density and converts this into an electric signal which activates a diaphragm control device XIX. The diaphragm drive X proper is controlled via this diaphragm control device. The diaphragm drive X which is equipped with a linear motor is described in detail in U.S. patent application Ser. No. 335,914, filed Feb. 26, 1973, now U.S. Pat. No. 3,812,501 issued May 21, 1974, and described in connection with a shutter rather than a diaphragm in U.S. Pat. No. 3,724,350, issued Apr. 3, 1973.

In FIG. 7 a photoelement 71 arranged behind the lens diaphragm 70 is connected to the two inputs of an operation amplifier 72. The output of the operation amplifier is fed-back via a variable resistor 73 to the inverted input (minus) of the operation amplifier. The resistor 73 is variable via the film speed setting line 32 from the film speed setting device VIII and via the time setting line 33 from the time setting device VI. The output of the operation amplifier 72 is connected via a capacitor 74 with the non-inverted input (plus) of a second operation amplifier 75. A voltage divider circuit formed of the resistors 76 and 77 lies against zero potential on the inverted input of the operation amplifier 75. The center tap of the voltage divider is connected via a resistor 78 with a potential line 79 which is connected via the connection W to the half-stabilized 5-volt voltage (output Z) of the current supply device VII. In the same way the non-inverted input of the first operation amplifier 72 is connected with this potential line 79. The output of the operation amplifier 75 is connected via two resistors 80 and 81 connected in series in each case with the base of an NPN transistor 83 and a PNP transistor 84 of the diaphragm control device XIX. The collector of the transistor 83 is connected with the current line 82 connected to the output Z of the current supply device VII, and the collector of the transistor 84 is connected with the zero potential. The two emitters of the transistors 83 and 84 are connected with each other and fed back, via a resistor 85 which limits the voltage amplification of the operation amplifier 75, to the inverted input of said operation amplifier.

Figure 8:
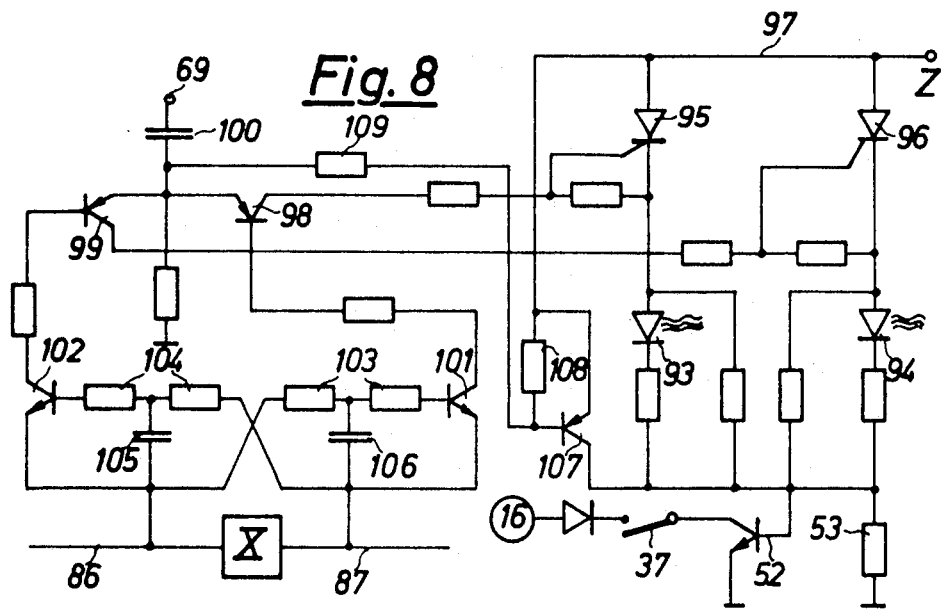
FIG. 8 is a wiring diagram of the indicating device schematically shown by the rectangle XI in FIG. 7, for indicating an improperly selected exposure time (shutter speed) or improperly selected diaphragm aperture or stop.

To the emitter of the transistors there is furthermore connected the feed line 86 of the diaphragm drive X whose other feed line 87 is connected with the potential line 79. To the two feed lines 86 and 87 of the diaphragm drive X, the indicating device for incorrectly selected time adjustment XI, explained in further detail in FIG. 8, is connected. The two operation amplifiers 72 and 75 obtain their operating voltage via the current line 82. The connecting line between the resistors 80 and 81 is connected via a transistor 88 to the potential line 79. The base of this transistor is connected via a resistor 89 to the current line 82 and via a transistor 90 to zero potential. The base of the transistor 90 is connected with the control lines 7 and 23. The base of the transistor 83 and of the transistor 84 can both be activated via the control line 11 and connected via a transistor 91 to the zero potential when its base receives a positive pulse over the control line 10. The connecting line between capacitor 74 and non-inverted input of the operation amplifier 75 is connected via the collector-emitter path of an NPN transistor 92 to the potential line 79. The base of this transistor is connected to the control line 9.

The manner of operation of this circuit is as follows: If no stream of light strikes the photoelement 71, for instance because the diaphragm 70 is completely closed, then the middle potential of the potential line 79 is present at the outputs of the operation amplifiers. The transistor 88 is driven and connects the output of the operation amplifier 75 or the bases of the transistors 83, 84 with the middle potential of the potential line 79. The transistors 83 and 84 are blocked. At the inverted input of the operation amplifier 75 there is a set voltage which is negative with respect to the potential of the potential line 79. If the transistor 88 is now blocked by applying a positive pulse to the base of the transistor 90 via the control line 7 or 23, whereby the transistor becomes conductive and the base of the transistor 88 lies at zero potential, then the difference in the voltage between the non-inverted input of the operation amplifier 75 which lies at middle potential and the set voltage lying at the inverted input produces a positive voltage with respect to emitter potential of the transistors 83, 84 at the output of the operation amplifier 75, so that the transistor 83 becomes conductive and a current flows from the current line 82 via the diaphragm drive X to the potential line 79.

The diaphragm drive displaces the diaphragm 70 in the direction towards larger aperture. With the opening of the diaphragm, more light falls upon the photoelement 71, and a negative voltage is produced at the output of the operation amplifier 72, which voltage is fed via the capacitor 74 to the non-inverted input of the operation amplifier 75. Since now the difference from the set voltage is less, a smaller positive voltage appears at the output of the operation amplifier 75, and the transistor 83 is less modulated, so that a reduced displacement current flows through the diaphragm drive X. The process described continues until the diaphragm has balanced itself, the difference between the non-inverted and the inverted inputs of the operation amplifier is zero, and no voltage with respect to the potential line 79 occurs at the output. Thus the transistor 83 is no longer activated, and the feed lines of the diaphragm drive X are without current. The diaphragm has reached its set value.

Should the diaphragm overshoot because of its inertia, then more light than desired falls on the photoelement, and a negative voltage greater than the set voltage is present at the output of the operation amplifier 72 or at the inverted input of the operation amplifier 75. In this way the voltage at the output of the operation amplifier 75 is negative with respect to the emitter potential of the transistors 83, 84, so that the transistor 84 becomes conductive and a current flows in opposite direction through the diaphragm drive, namely from potential line 79 via the feed line 87, via the feed line 86, the emitter-collector path of the transistor 84 to zero potential. In this way the diaphragm drive displaces the diaphragm in the direction of "close."

The variable resistor 73 determines the voltage amplification of the operation amplifier 72 and thus, via the operation amplifier 75, the path of adjustment of the diaphragm drive 10 and thus the diaphragm aperture. The circuit is so designed and adapted that for a predetermined luminous density of the object, specific film speed and selected exposure time, the diaphragm aperture optimum for the taking of a photograph is set.

Via the control line 11, the diaphragm drive can be displaced directly in the direction of the opening of the diaphragm and, via the control line 10, directly in the direction of the closing of the diaphragm, the transistor 83 and the transistor 84 respectively becoming conductive and the current flowing through the feed lines 86 and 87 as described above.

In order to compensate for the error which results from the fact that the photoelement 71 measures not only the quantity of light passing through the diaphragm 70 but also the stray light entering, for instance, through the viewer shaft or focusing hood, and which light does not contribute to the exposing of the film, a stray-light compensation circuit comprising the capacitor 74 and the transistor 92 is provided. The principle of this circuit has already been described in U.S. patent application Ser. No. 343,257, filed Mar. 21, 1973, now U.S. Pat. No. 3,792,485, granted Feb. 12, 1974. With the diaphragm 70 fully closed, the transistor 92 is driven by the activating of the transistor 92 via the control line 9, the so-called clamping of the stray light level. The stray light now falling on the photocell 71 causes a charging of the capacitor 74 in the manner that the plate of the capacitor facing the non-inverted input of the operation amplifier 75 receives a potential which is higher than the middle potential of the potential line 79. After the blocking of the transistor 92 upon elimination of the activating via the control line 9, the charge of the capacitor 74 is retained over the entire diaphragm adjustment process described above. After the blocking of the transistor 88 via the control line 7, this increased potential lies at the non-inverted input of the operation amplifier 75, so that there occurs here a voltage difference which is increased by the stray-light voltage. In this way a slightly larger displacement of the diaphragm drive in the direction towards the opening of the diaphragm is effected than would in itself be necessary on basis of the quantity of light measured by the photocell. In this way the influence of the additional stray light which does not contribute to the exposing of the film is excluded.

In the event that the prevailing light from the object being photographed is such that no optimum diaphragm aperture can be set in view of the selected shutter speed or exposure time and the predetermined film speed, the indication "time set too short" or "time set too long" is given via the indicating device XI for improperly selected time setting by the lighting up of one or two arrows. The circuit of this indicating device is shown in FIG. 8. The indication takes place via two luminous diodes 93 and 94, each of which is connected in series with a thyristor 95 and 96 respectively. The anodes of the thyristors are connected via a current line 97 with the output Z of the current supply device VII. The control electrodes or gates of the two thyristors are each connected with the collector of a transistor 98 and 99 respectively. The emitters of these two transistors are connected together and joined via a capacitor 100 at point 69 to the collector of the transistor 90 in FIG. 7. The base of each of the two transistors is connected via a resistor with the collector of another transistor 101 and 102 respectively, the emitters of which are connected via two series-connected resistors 103 and 104 respectively with the base of the other transistor 102 and 101 respectively. The junction of the resistors 104 is connected via a capacitor 105 to the emitter of the transistor 102 and the junction of the resistors 103 is connected via a capacitor 106 with the emitter of the transistor 101. Furthermore, the emitters of the transistors 101, 102 are connected with the feed lines 87 and 86 respectively of the diaphragm drive X. The series circuit of thyristor 95 and luminous diode 93 or thyristor 96 and luminous diode 94 can be bridged over by the emitter-collector path of a PNP transistor 107 whose base is connected on the one hand via a resistor 108 to the current line 97 and via a resistor 109 via the capacitor 100 at point 69 to the collector of the transistor 90 in FIG. 7.

The manner of operation of the circuit shown in FIG. 8 is as follows:

We will assume that in a prior diaphragm setting process the time was selected too short so that the luminous diode 93 lights up and the sign "time setting too short" becomes visible. We now change the time setting by means of the time adjustor VI and assume that with the prevailing luminous density of the object and given film speed, this exposure time is also too short for an optimum exposure. With the activating of the transistor 90 in FIG. 7 via the control lines 7 or 23, the transistor 88 is blocked and the voltage difference in the operation amplifier 75 leads at the base of the transistor 83 to a voltage which is positive with respect to the emitter potential, so that the transistor 83 is driven and a current flows from feed line 86 via the diaphragm drive X to the feed line 87.

The diaphragm drive will displace the diaphragm 70 in the direction towards a larger diaphragm aperture. With the commencement of the flow of current in the said manner through the feed lines 86 and 87, the transistor 101 in FIG. 8 becomes conductive and thus also drives the transistor 98. When the transistor 90 becomes conductive and the flow of current starts in the feed lines 86 and 87 of the diaphragm drive X, a negative pulse is present at the collector connection 69 of the transistor 90 in FIG. 7. The negative flank of the pulse produces, via the capacitor 100 in FIG. 8, a drive of the transistor 107 and, via the conductive transistor 98, the application of a negative voltage to the control grid of the thyristor 95. With the driving of the transistor 107, the anode-cathode path of the thyristor 95 is short-circuited and, under the influence of the negative control-grid voltage, the thyristor goes out. The luminous diode 93 thus goes out and the indication "time setting too short" disappears.

The diaphragm drive X will displace the diaphragm 70 up to the largest diaphragm aperture due to the fact that the exposure time has been selected too short. Here the diaphragm 70 comes against a stop and prevents further displacement. Since furthermore the voltage at the non-inverted input in the operation amplifier 75 is more positive than the set voltage on the inverted input, a positive voltage will continue to be present at the base of the transistor 83 and the transistor 83 will remain conductive. Thus a current continues to flow from the line Z over the transistor 83, the feed line 86, the diaphragm drive X and the feed line 87 to the potential line 79. The transistors 101 and 89 in FIG. 8 thus continue to remain conductive. The transistor 107 has in the meantime blocked, since after reaching the pulse height of the pulse present at the connection 69, the activating is eliminated. To the anode-cathode path of the thyristor 95 there is thus again connected the operating voltage of 5 volts. If the activating of the transistor 90 is now interrupted via the control line 7 or 23, then the potential 69 at the collector of the transistor 90 jumps from zero to positive potential, and this positive voltage flank produces, via the capacitor 100 and via the still conductive transistor 98, a positive pulse at the gate of the thyristor 95, so that the latter fires and connects the luminous diode 93. The indication "time setting too short" lights up.

If the time setting selected is too long, then the direction of current in the feed lines 87 and 86 will be reversed correspondingly, and thus the transistor 105 and the transistor 99 will become conductive, so that upon the occurrence of a negative pulse at the collector connection 69 of the transistor 90, the thyristor 96 is activated and the luminous diode 94 connected. The indication "time setting too long" lights up.

Figure 2:
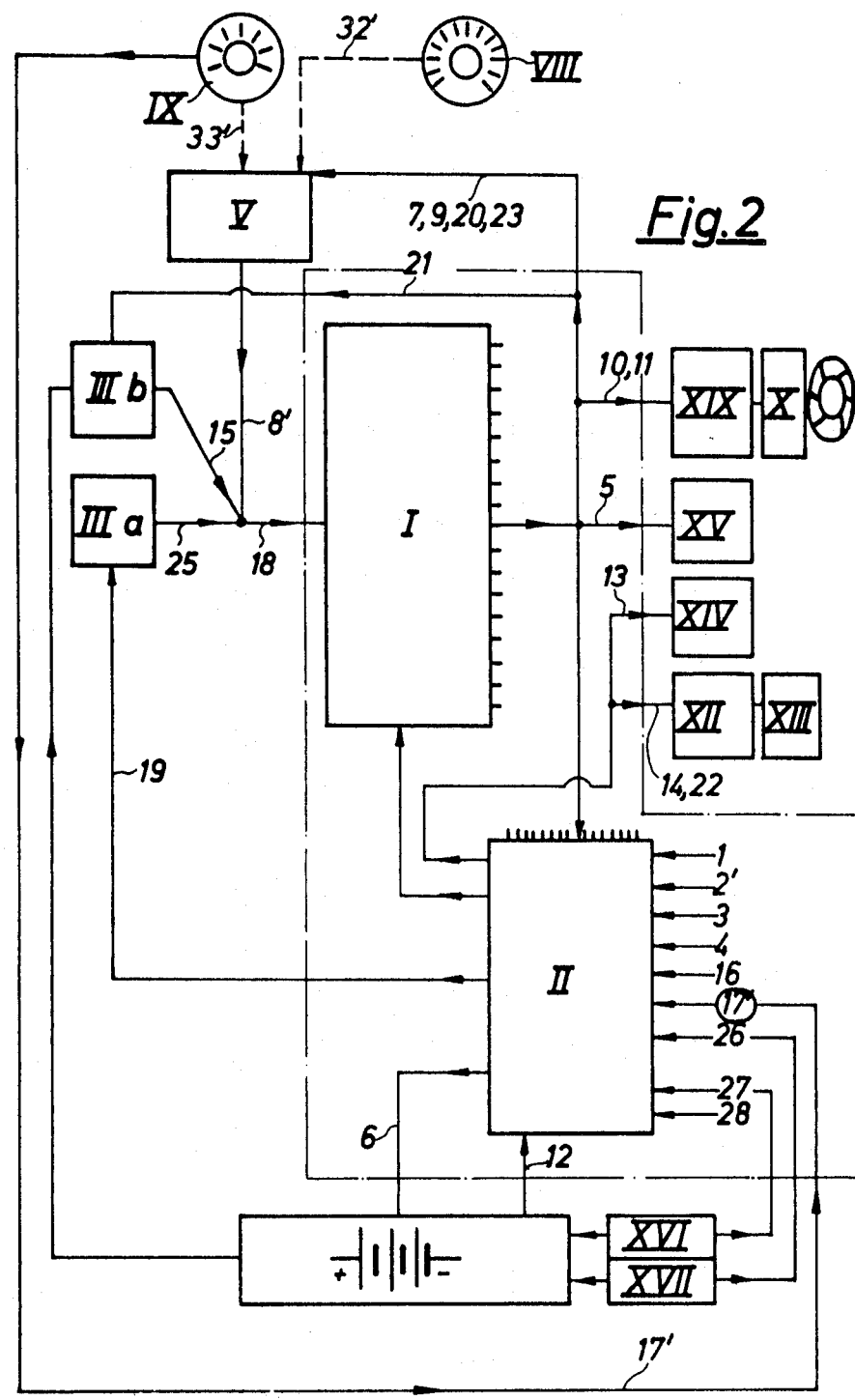
FIG. 2 is a similar diagram of a camera in which the diaphragm aperture is pre-selected and the shutter time or speed is adjusted automatically.

The indicating device operates in the same manner in the circuit arrangement of FIG. 2, where an automatic time mechanism IX is provided instead of the automatic diaphragm mechanism IV. In this case, upon the lighting up of the indication, the diaphragm setting device IX must be displaced instead of the time setting device VIII. According to the indication "time setting too long," there appears the indication "diaphragm setting too small" and, conversely, the indication "diaphragm setting too large."

Figure 9:
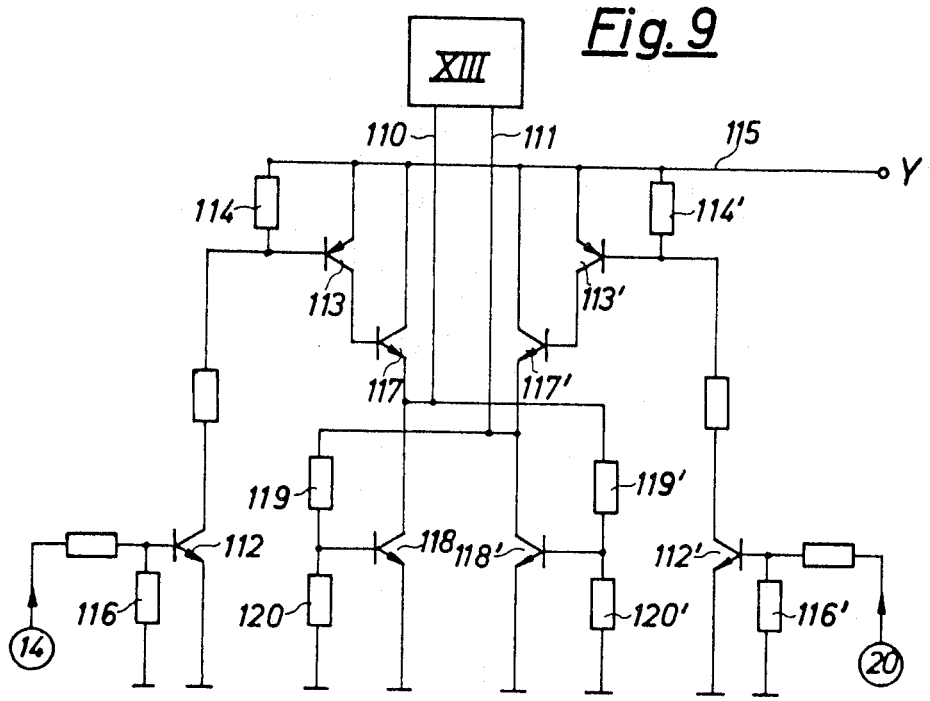
FIG. 9 is a wiring diagram for the shutter control device schematically shown at XII in FIGS. 1 and 2, with the shutter drive XIII.

FIG. 9 shows the wiring diagram of the shutter control device XII via which the shutter drive XIII can be closed or opened. The construction and the manner of operation of the shutter drive has already been described in detail in the above mentioned U.S. Pat. No. 3,724,350, granted Apr. 3, 1973. The shutter drive consists essentially of a pot magnet which has a cylinder coil which is movable coaxial to the pot core. The cylinder coil is mechanically connected with the sector drive rings or indirectly with the shutter sectors and receives its exciting current via the lines 110 and 111 in FIG. 9 from the shutter control device XII. The latter is of entirely symmetrical construction and consists of a transistor 112 or 112' whose base is activated via the control line 14 for the closing of the shutter or via the control line 22 for the opening of the shutter. The collector of the transistor 112 or 112' is connected with the base of another transistor 113 or 113' which in its turn is connected via a resistor 114 or 114' to the current line 115 connected with the output Y of the current supply device VII. The base of the transistor 112 or 112' is connected via a resistor 116 or 116' with the zero potential, so that the transistor is continuously blocked without activation by the lines 14 and 22 respectively. Via the emitter-collector path of the PNP transistor 113 or 113', the base of an NPN transistor 117 or 117' is connected to the current line 115. The collector of this transistor is connected with the current line 115, while the emitter lies at zero potential via the collector-emitter path of another NPN transistor 118 or 118'. The base of the transistor 118 or 118' is connected to the center tap or a voltage divider circuit consisting of the resistors 119 and 120 and 119' and 120' respectively, which voltage divider circuit is connected between the collector of the symmetrical transistor 118' or 118 and the zero potential. The current line 110 is connected to the emitter of the transistor 117 (or to the collector of the transistor 118) and the current line 111 of the shutter drive XIII is connected to the emitter of the transistor 117' (or the collector of the transistor 118').

The manner of operation of this arrangement is as follows: If a positive pulse appears at the control line 14 for the closing of the shutter, then the transistor 112 becomes conductive, as does the transistor 113. In this way the base of the transistor 117 is connected to the current line 115, so that this transistor also becomes conductive. A current thus flows from the current line 115 via the collector-emitter path of the transistor 117 and the voltage divider circuit 119' and 120' to zero potential. At the resistor 120', a voltage drops off, so that the transistor 118' becomes conductive. In this way a current flows from the current line 115 via the collector-emitter path of the transistor 117, the current line 110, the shutter drive XIII via the current line 111 and the collector-emitter path of the transistor 118' to zero potential. As a result of the flow of current in the cylinder coil present in the magnetic field, the latter moves in the direction towards the closing of the shutter.

Upon the appearance of a positive signal in the control line for shutter opening 22, the transistor 112', 113', 117' and 118 correspondingly becomes conductive. In this way a current flows from the current line 115 via the collector-emitter path of the transistor 117', the current line 111, the shutter drive XIII, the current line 110, the collector-emitter path of the transistor 118 to zero potential. The driection of current in the cylinder coil is reversed and the shutter opens.

Figure 4:
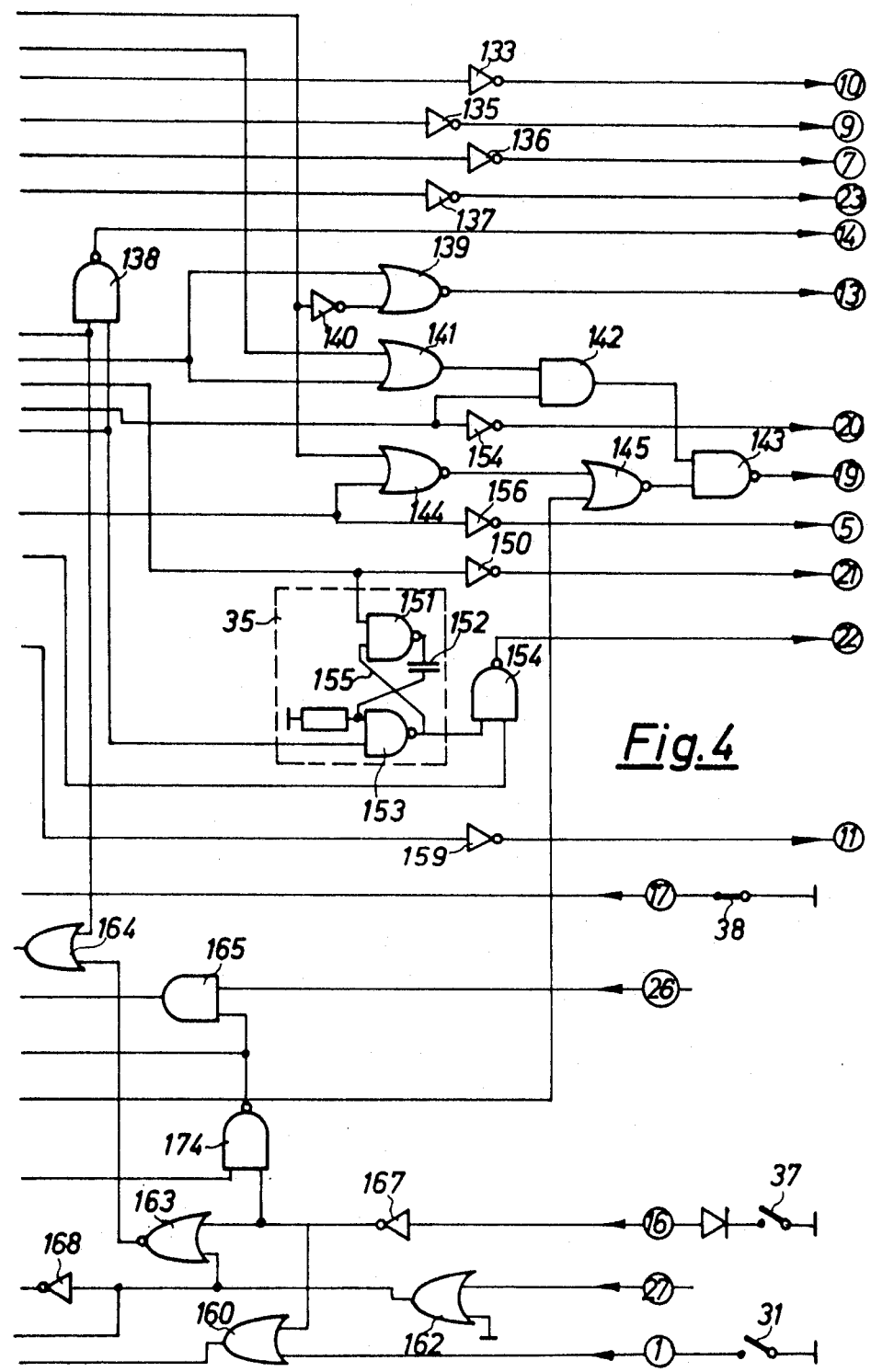

In the logic wiring diagram in accordance with FIGS. 3 and 4, the electronically controlled still camera which comprises the step-by-step switch I and the control and program part II will be described on the basis of the function of the camera. By setting the film-speed setting device VIII and selecting an exposure time by means of the time-setting device VI, the resistors 73 in the automatic diaphragm-setting mechanism IV (Fig.

7) and 66 of the time-forming generator IIIc (FIG. 6) are set in the manner previously described via the setting lines 32, 33 and 34. Upon the actuation of the release XVI, the contact 39 in FIG. 5 is closed and the operating voltage of 10 volts and 5 volts is present as described above at the outputs S and Z respectively of the current supply device VII. The connecting pulse brings it about via the capacitor 51 that the input of the NOR member 130 connected with the control line 12 assumes the value logic 1 (in the following designated 1). As can be noted from FIG. 10, regardless of the value of the other input, the output of the NOR member 130 assumes the value logic zero (in the following designated 0). In this way the inputs of the AND members 131 and 132 connected with said output have the value 0 and, as can be noted from FIG. 10, the output of these AND members assumes the value 0 independently of the value of the other input. Thus the value 0 is present at the clear or reset zero inputs of the counters A,B,C, and D, and the step-by-step switch is placed in its starting position in which the output zero of the step-by-step switch I has the value 0, while the other outputs one to fifteen have the value 1. Via the inverter 133, the control line 10 receives a potential which is positive with respect to the zero potential, so that the transistor 91 in FIG. 7 becomes conductive and on its part effects the driving of the transistor 84, whereby a current flows from the potential line 79 via the feed line 87 through the diaphragm drive X, the feed line 86 and the transistor 84 to zero potential, so that the diaphragm drive closes the diaphragm 70 in the manner described in connection with FIG. 7. The closed diaphragm covers the lens in lighttight fashion.

With the occurrence of a voltage at the output Z of the current supply device VII, the control pulse generator IIIa is connected and, in the manner described in connection with FIG. 6, after, for instance about 10 milliseconds (msec), produces a pulse which permits the thyristor 60 in FIG. 6 to become conductive via the control line 25. In this way the control line 18 is connected to zero potential and a positive pulse appears at the block input of the step-by-step switch I, which pulse causes the step-by-step switch to be placed on step one, as a result of which the output one of the step-by-step switch now assumes the value 0, while all other outputs have the value 1. Via the inverter 135, a potential which is positive with respect to the potential line 79 in FIG. 7 thus appears in the control line 9 for the clamping of the stray-light level and the transistor 92 becomes conductive. In the manner described in connection with FIG. 7, the capacitor 74 is charged corresponding to the stray light prevailing when the diaphragm 70 is closed.

After an additional 10 msec, the step-by-step switch is placed by the control pulse generator IIIa on step two in which the output two of the step-by-step switch assumes the value 0. Via the inverter 136, the control line 7 receives positive potential and the transistor 90 in FIG. 7 is driven, whereby the transistor 88 is blocked and the automatic diaphragm setting mechanism is placed in action. Since the time of 10 msec during which the line 7 is started up for the prior balancing may not be sufficient for the setting of the diaphragm, upon the advance of the step-by-step switch to step three, the control line 23 is activated via the inverter 137 for the subsequent balancing, whereby the transistor 90 again becomes conductive and the process for the setting of the diaphragm can be continued.

After an additonal 10 msec, the step-by-step switch is placed at step four, so that the output four of the step-by-step switch assumes the value 0. while all other outputs have the value 1. Thus the input of the NAND member 138 connected with output four of the step-by-step switch assumes the value 0 and the input of the NAND member 138 which is connected with the output eight of the step-by-step switch assumes the value 1., As can be noted from FIG. 10, the output of the NAND member 138 thus has the value 1. A positive pulse is thus applied to the transistor 112 in FIG. 9 via the control line 14 for the closing of the shutter, so that said transistor drives and the shutter control device XII, in the manner described in connection with FIG. 9, brings the shutter XIII in the direction of closing of the shutter.

After an additional 10 msec, the step-by-step switch is placed at step five by the control pulse generator IIIa, whereupon the output five of the step-by-step switch assumes the value 0. In this condition, the mirror of the reflex camera is in the finder or viewing position, so that the sensing switch 36 for the position of the mirror is opened. Similarly, the auxiliary shutter is still in the position in which it covers the picture window, the scanning switch 29 for the auxiliary shutter position being closed. The instantaneous-value input lines 3 and 4 respectively which lead from the scanning switches 36 and 29 respectively to the control and program part II thus have a positive and a negative potential respectively. In this way, with due consideration of the inverter 140, the inputs of the NOR member 139 assume the value 0, so that the output has the value 1. Via the control line 13, the mirror magnet release XIV is thus activated so that the mirror is released and swings up into the picture-taking position under the action of a cocked spring. At the same time, under the influence of another drive spring, the auxiliary shutter swings into the picture-taking position. As soon as the mirror leaves the lower position, the scanning switch 36 can close, and as soon as the auxiliary shutter arrives in its upper position, it opens the scanning switch 39. Any convenient mechanism for moving the mirror and auxiliary shutter between view position and picture taking position may be used, but preferably such mechanism is in the form disclosed in the United States patent application of Guenter Adamski, Ser. No. 441,501, filed Feb. 11, 1974 owned by the owner of the present application.

With the closing of the scanning switch 36, the instantaneous-value input line 4 is connected to zero potential and the value 1 appears at the output of the inverter 140. In this way the output of the NOR member 139 assumes the value 0 and the activating of the magnet release via the control line 13 is interrupted. With the activating of the output five of the step-by-step switch, the inputs of the OR member 141, with the scanning switch 29 closed, assume the value 0 and thus the output also assumes the value 0. Thus the value 0 and the value 1 lie at the inputs of the AND member 142, since output seven of the step-by-step switch has the value 1. In this way, the output of the AND member 142 has the value 0. The value of the output of the NOR member 144 is 0, since the input connected with output nine of the step-by-step switch has the value 1. Similarly the output of the NOR member 145 has the value 1, since the value 0 is now present at both inputs. This results from the fact that the outputs of the NOR members 146 and 147 assume the value 0, since in each case one of their inputs is connected with an output of the step-by-step switch which has the value 1 (output twelve and output fourteen respectively). The output of the OR member 148 thus assumes the value 0.

The inputs of the AND member 157 have the value 1, since once again both inputs are connected to the outputs fourteen and fifteen of the step-by-step switch. The output of the AND member 157 thus assumes the value 1 and the output of the NOR member 158 assumes the value 0. Thus the output of the OR member 149 receives the value 0, since both inputs are 0. As was to be proven, the value 1 is present at the NOR member 145 and the input of the NAND member 143 connected with it also has the value 1. With the value 0 of the other input, the output assumes the value 1. Thus positive potential passes via the control line 19 to the base of the transistor 63 in FIG. 5. The transistor drives and the control pulse generator IIIa is disconnected as a result of the short-circuiting of the capacitor 58.

If the auxiliary shutter has moved into its upper position, the so-called picture-taking position, the switch 29 is opened and the input of the OR member 141 which is activated via the instantaneous-value input line 3 assumes the value 1. Thus the output assumes the value 1 and the two inputs of the AND member 142 also assume the value 1 and thus also its output, and thus the inputs of the NAND member 143 have the value 1. The output of the NAND member 143 assumes the value 0 and thus the transistor 63 in FIG. 6 is again blocked and the control pulse generator IIIa,after charging of the capacitor 58, again gives off a control pulse to the clock input of the step-by-step switch I which effects a placing of the step-by-step switch at step six, so that the output six of the step-by-step switch assumes the value 0.

There thus appears at the output of the inverter 150 a signal 1 which via the control 21 drives the transistor 65 in FIG. 6. In this way, as already described, the control pulse generator IIIb is connected for the equalizing of different starting times of the shutter opening apparatus in the case of battery voltage losses, and it places the step-by-step switch at step seven within a period of time which is a greater or lesser amount below the value of 10 msec, depending on the voltage loss. Here the control pulse generator IIIa is then disconnected, so that it cannot supply an additional pulse. Upon the activating of the output six of the step-by-step switch, the control line 22 is simultaneously fed a signal via the monoflop 35, so that, as described in connection with FIG. 9, the shutter control device XII controls the shutter drive XIII in the direction for the opening of the shutter.

This is effected in the manner that the input of the NAND member 151 of the monoflop 35 which is connected with the output six of the step-by-step switch has the value 0 and thus the signal 1 appears at the output. This signal is fed via the capacitor 152 to the input of the NAND member 153 whose other input has the value 1. Thus the output of the NAND member 153 has the value 0 and thus the inputs of the NAND member 154 have the value 0 and 1. At the output of the NAND member 154, a signal is produced which via the control 22 drives the transistor 112' in FIG. 9, as a result of which, as described, the transistors 113', 117', and 118 become conductive and a current flows via the feed line 111 to the feed line 110 through the shutter drive XIII.

The monoflop 35 is so designed that it falls back into its starting condition about 10 msec after the start of the opening of the shutter due to the fact that the input of the NAND member 153 connected with the capacitor 152 assumes the value 0. The output of the NAND member 153 thus assumes the value 1 and the output of the NAND member 154 the value 0, so that the control of the shutter drive is interrupted via the control line 22. If the exposure time, however, has terminated before the end of this 10 msec, the monoflop, upon the activating of the output eight of the step-by-step switch I, will be moved back into its starting position in the manner that the input of the NAND member 153 connected with the output eight of the step-by-step switch assumes the value 0.

By the dropping-back of the monoflop into its stable position after about 10 msec, the result is to be achieved that the windings of the shutter drive XIII are traversed by current only for a specific period of time which does not overload the windings, namely 10 msec. Furthermore a certain independence of the activating of the shutter opening from the position of the step-by-step switch is obtained by the monoflop. The activating of the shutter can thus be maintained independently of the actuating of the corresponding output for a longer period of time, as a result of which the swinging back of the shutter after it reaches its open position is avoided. In the event that, for instance, the shutter is opened on step six and after reaching the open position the step-by-step switch is to be advanced further to step seven, the activation would drop out and the shutter opening with the high speed would definitely move back by the impact into its closed position and be reflected here again in the open direction. In order to avoid this, the step-by-step switch would have to maintain the activating of the shutter in opening direction for a longer period of time, as a result of which again the termination of the exposure time takes place too late. These disadvantages are avoided with the monoflop circuit.

As already mentioned, the control-pulse generator IIIb switches the step-by-step swith to step seven, so that the output seven of the step-by-step switch assumes the value 0. The logic decision elements 141, 142, 144, 145, and 143 thus show the following value: inputs of the OR member 141 1 (since output five of the step-by-step switch has the value 1), inputs of the AND 142 the value 1 (since the output of the OR member 141 is 1) and 0 (since the output seven of the step-by-step switch is 0). Thus the output of the AND member 142 assumes the value 0. As already described with regard to switch step five of the step-by-step switch, the output of the NOR member 145 has the value 1. Thus the inputs of the NAND member 143 have the value 0 and 1 and at the output of the NAND member 143 there occurs a signal which via the control line 19 permits the transistor 63 of the control pulse generator IIIa to become conductive. Thus, as already described, the control pulse generator IIIa is disconnected.

At the same time there appears at the output of the inverter 154 a signal which, via the control line 20, connects the transistor 68 of the time-forming generator IIIc in FIG. 6 through, so that the transistor 67 becomes conductive and the time-forming generator enters into action. After the charging time of the capacitor 58 which is determined by the exposure time selected, a positive pulse appears at the output eight of the time-forming generator IIIc, which pulse connects the transistor 60 through. In this way, as already repeatedly described, the control line 18 is placed at zero potential, and a positive signal which arrives at the clock input of the step-by-step switch I occurs at the output of the inverter 134, said signal switching the step-by-step switch to step eight, so that now output eight assumes the value 0, and thus the input of the NAND member 138 has the value 0, and thus there is provided at the output of the NAND member 138 a signal which is fed via the control line 14 to the transistor 112 of the shutter control device XII in FIG. 9.

The transistor 112 and accordingly the transistors 113, 117 and 118' become conductive in the manner described, and a current flows over the feed line 110 of the shutter drive XIII to the feed line 111. The shutter drive is displaced in the direction of closing. At the same time, as described, the input connected with output eight of the NAND mamber 153 of the monoflop assumes the value 0, so that the output of the NAND member 153 has the value 1. In the event that the exposure time is shorter than 10 msec, the monoflop is still in its unstable condition and is brought back into its stable output position by the appearance of a signal at the output of the NAND member 153 via the return line 155, so that the output of the NAND member again assumes the value 0. At the same time, the output of the NAND member 154 also assumes the value 0, so that the activating of the control line 22 for the opening of the shutter is interrupted. With the placing of the step-by-step switch on step eight, the value of the input of the AND member 142 connected with the output seven of the step-by-step switch changes from 0 to 1. Thus the output of the AND member 142 assumes the value 1 and with unchanged values of the inputs and outputs of the logic decision elements 141, 144, 145, the inputs of the NAND member 143 assume the value 1, so that the output of the NAND member 143 changes its value to 0. In this way the activating of the transistor 63 of the control pulse generator IIIa is interrupted and the control pulse generator is again connected.

After 10 msec, the control-pulse generator IIIa via the control line 18 places the step-by-step switch on step nine, so that now the output nine of the step-by-step switch has the value 0. With unchanged values of the outputs and inputs of the logic decision elements 141 and 142, the output of the NOR member 144 assumes the value 1 (since switch 36 is closed and output nine of the step-by-step switch has the value 0) and there is thus produced at the output of the NOR member 144 a signal with unchanged value of the logic decision elements 146, 147, 148, 149, 157, 158, (see under step five) the inputs of the NOR member 145 have the value 1, thus the output of the NOR member 145 assumes the value 0, thus the value 1 and 0 is present at the inputs of the NAND member 143, so that there is produced at the output of the NAND member 143 a signal which via the control line 19, as already described, disconnects the control pulse generator. At the same time there is produced at the output of the inverter 156 a signal which via the control line 5 causes the connecting of the film-transport motor XV. By means of the mirror mechanism described in the above mentioned U.S. patent application 441,501 (CS case 1821, Rollei case A 939/945 US), the film-transport motor, at the same time as effecting the transport of the film, causes the swinging of the auxiliary shutter and of the mirror back into their respective viewing positions.

After a slight rotation of the film-transport motor, a self-holding circuit is closed, as described in U.S. patent application 441,501 just mentioned (CS case 1821), so that the motor XV runs independently of the activation by the step-by-step switch until the film has been advanced by one picture and the self-holding circuit, as also described there, is interrupted mechanically. As soon as the auxiliary shutter leaves its upper or picture taking position, the contact 29 closes, and as soon as the mirror engages in its viewing position, it opens the contact 36. With the opening of the contact 36, a signal occurs in the control line 4, so that the output of the NOR member 144, assumes the value 0, since its input has the value 1. With unchanged values of the logical decision elements 146, 147, 148, and 149, the inputs of the NOR member 145 have the value 0 and thus a signal occurs at the output of the NOR member 145. The output of the OR member 141 has the value 1, since its one input is connected with the output four of the step-by-step switch I; thus the inputs of the AND member 142 have the value 1, as the result of which a signal occurs at the output of the AND member 142.

In this way the inputs of the NAND member 143 assume the value 1 and no signal appears at the output, so that the transistor 63 of the control-pulse generator IIIa again blocks and the control-pulse generator IIIa is again connected. Summarizing, thereupon, upon the downward swinging of the mirror into its viewing position, the control-pulse generator IIIa is again connected and, after a further 10 msec, switches the step-by-step switch I to step ten, so that now the output ten of the step-by-step switch assumes the value 0. A signal thus appears at the output of the NAND member 154, since the input connected with the output ten of the step-by-step switch has the value 0. In the manner described, the signal activates the transistor 112' of the shutter control device XII in FIG. 9 and the shutter is opened.

The control-pulse generator IIIa now places the step-by-step switch at step eleven which is blank or not occupied, and after an additional 10 msec at step twelve, so that now output twelve of the step-by-step switch assumes the value 0. At step twelve, inquiry is made whether the measurement button XVII or switch 31 is closed for the serial-picture switching. If this is not the case, then the control-pulse generator IIIa, after an additional 10 msec, places the step-by-step switch at step thirteen, so that the output thirteen of the step-by-step switch assumes the value 0. There is thus produced at the output of the inverter 159 a signal which drives the transistor 83 of the diaphragm control device XIX in FIG. 7 and opens the diaphragm 70 in the manner described. With the mirror in the viewing position, shutter opened and diaphragm opened, the camera is again ready to take a picture.

After an additional 10 msec, the step-by-step switch is switched to step fourteen, so that this output assumes the value 0. Since the selector switch 31 for the series picture switching is not on, a positive potential lies at the instantaneous-valve input line 1 and the input of the OR member 160 assumes the value 1. Thus a signal occurs at the output of the OR member 160, as well as at the output of the OR member 161, and thus the inputs of the NOR member 147 assume the values 1 and 0, whereby the output of the NOR member 147 receives the value 0. The output of the AND member 157 has the value 0, since one of its inputs is connected to the output fourteen of the step-by-step switch. Thus the inputs of the NOR member 158 have the value 0 and there appears at the output of the NOR member a signal which, via the control line 6, drives the transistor 50 of the current supply device VII, so that the transistors 47 and 45 in FIG. 5 block and thus the outputs S and Z of the current supply apparatus VII become without current. In this way the process regulator and all the camera elements are disconnected.

Output fifteen of the step-by-step switch is no longer actuated. This output serves merely as safety upon the disconnecting of the energy supply should any disturbance take place in the logic circuit as a result of the disconnection by step fourteen and the disconnection not yet being completed. The placing of the step-by-step switch on step fifteen produces in the same manner a control pulse in the control line 6.

In addition to this course of the program which has been described in which only the release is actuated, the automatic setting of the diaphragm is effected, the exposure program takes place and the diaphragm is opened again, several variations of this course of the program are possible:

1. Exposure Measurement

For an exposure measurement, the measurement button XVII is depressed, so that the contact 40 in FIG. 5 is closed. The program takes place in the manner previously described from step zero to step three, where the setting of the diaphragm is completed. By means of a pointer on the diaphragm ring, the reading of the diaphragm can be effected. If no diaphragm setting will serve for the prevailing brightness of the object, the indication "time setting too short" or "time setting too long" takes place, as already described, by the lighting up of the diodes 93 and 94 in FIG. 8. The step-by-step switch is moved from step three to step four as described, step four assuming the value of 0. Since the release XVI is not depressed, the contact 39 is opened, so that the signal 1 occurs at the input of the OR member 162, and the output thus also assumes the value 1. Since the output of the OR member 162 is connected with the input of the NOR member 163, the output of the NOR member 163 assumes the value 0.

In this way the inputs of the OR member 164 have the value 0, since they are connected on the one hand with the activated output four of the step-by-step switch and on the other hand with the output of the NOR member 163. The output of the OR member 164 connected to the preset input of the counter D assumes the value 0. In this way the counter D (flip-flop) changes its condition from 0 to 1, which means that a value of eight is added onto the decoder which, as a result of the actuation of the output four of the step-by-step switch, has a value of four, so that as a whole the step-by-step switch jumps from step four to step twelve. The output twelve of the step-by-step switch now has the value 0.

With the measurement button XVII depressed and therefore contact 40 closed, the instantaneous-value input line 26 is at zero potential. The output of the AND member 165 thus assumes zero potential, since the input connected with the instantaneous-value input line 26 also has the value 0. In this way the inputs of the NOR member 146 have the value 0, and thus the output 1, and thus also the output of the OR member 148 is 1, as well as the output of the OR member 149 is 1 and thus also the input of the NOR member 145. As a result of this, the output of the NOR member 145 and of the input of the NAND member 143 connected with it assumes the value 0. At the output of the NAND member 143 there is produced a signal which, via the control line 19, disconnects the control-pulse generator IIIa in the manner already described. In this way, as long as the measurement button is depressed, the step-by-step switch remains at step twelve.

If, for instance, the time-setting device VI is displaced in case of a reading "time setting too short," while the measurement button remains depressed, then upon the disengagement of the time-setting device from the previously set position, the closed contact 38 is opened and, upon the engagement of the time-setting device into the new position which is set for a different exposure time, it is closed again. The switch 38 is connected via the instantaneous-value input line 17 with the inverter 166. In this way there is produced at the output of the inverter 166 a negative signal whose rising flank via the input 42c in the flip-flop 42 causes the output 42a of the flip-flop to assume the condition "plus" of the so-called D input 42b of the flip-flop. The flip-flop is set back (reset). A prerequisite for this is that the flip-flop 42 is in readiness position, i.e., that it is set, a signal being present at its input 42d. This is achieved in the manner that with the selector switch 37 for locking against release not depressed or release XVI not depressed, the input of the NAND member 174 has the value 0. The output of the NAND member and thus the one input of the AND member 175 connected with it thus assume the value 1.

With the measurement button depressed, as already stated, the output of the AND member 165 and of the input of the NOR member 146 connected with it has the value 0. If the step-by-step switch I is set at step twelve, then its output twelve and the input of the NOR member 146 connected with it assume the value 0. In this way the output of the NOR member 146 and the other input of the AND member 175 connected with it are given the value 1 and a signal is present at the output of the AND member 175 and thus at the input 42d of the flip-flop 42. With the resetting of the flip-flop, the input of the OR member 167 connected with the output 42a of the flip-flop 42 receives the value 1 so that its output also assumes the value 1. In this way the output of the NOR member 130 also has the value "0" and the outputs of the AND members 131 and 132 also have the value 0. In this way the step-by-step switch I is placed at step zero via the clear or reset zero inputs of the counters A, B, C, D, in which step a new exposure measurement with renewed setting of the diaphragm takes place in accordance with the scheme described. The time-setting device VI is thus displaced in the illuminated direction of the arrow until the indication disappears.

If, in case of correct exposure, the step-by-step switch is at step twelve as a result of the depressed measurement button XVII and if now, in addition, the release XVI is depressed, then the clear or reset zero input of the counter D of the step-by-step switch I receives the value 0 via the output of the AND member 131 and there takes place the opposite process to that which takes place upon the actuation of the counter D via the OR member 164 during the occupying of output four of the step-by-step switch, namely the value eight of the counter D is deducted from the value 12 of the decoder, so that as a whole the step-by-step switch is placed at step four. This is done in the manner that with the closing of the switch 39 in FIG. 5, the inputs of the OR member 162 assume the value 0 and thus the output assumes the value 0.

In this way a positive signal passes via the inverter 168 to the input 43c of the flip-flop 43. The flip-flop 43 is acted on via the output of the NOR member 146 in the input 43d with a positive signal so that it is in readiness position. The signal 1 is produced at the output of the NOR member 146 since both inputs have 0, since the one input is connected with the activated output twelve of the step-by-step switch and the other input is connected with the output of the AND member 165 at whose input negative potential is present via the instantaneous-value input line 26 with the switch 40 closed. The rising flank of the signal at the input 43c of the flip-flop 43 has the result that the flip-flop flips and the non-inverted output of the flip-flop assumes the condition of the so-called D input 43b, namely "plus." The input of the NAND member 169 is, however, connected with the inverted input 43a of the flip-flop 43, and thus receives the value 0. A signal is thus produced at the output of the NAND member 169 so that the inputs of the AND member 170 receive the value 1, as its output also does. Since the film-transport motor XV stops, the contact 41 is opened and the instantaneous-value input line 28 is at positive potential. In this way the inputs of the NAND member 171 have the value 1 and the output assumes the value 0. In this way the input of the AND member 131 receives the value 0 and thus also its output which is connected with the clear input of the counter D. The step-by-step switch is placed — in the manner already described — on step four. If the release XVI is here still depressed, then the exposure process described now takes place with the advancing of the step-by-step switch I to steps five, six, seven, eight, etc., until the process regulator, upon the release of the measurement button XVII, is connected to step fourteen. The exposure takes place in this connection with the diaphragm value originally indicated by the exposure-measurement process. If the measurement button remains engaged, the step-by-step switch I, however, as described above, remains on step twelve. By renewed actuation of the release, the process described above can be repeated.

2. Serial-Picture Switching

If it is desired to take several pictures one after the other, then the selector switch 31 for the serial-picture switching is to be closed. Upon viewing the manner of operation, three sub-programs can be noted:

2.1. The release is depressed. In this way the process of picture-taking described at the start takes place. The step-by-step switch passes through all steps from step zero to step fourteen and is then automatically reset to step zero, from where it is again advanced. This takes place until the release XVI is freed again. Then the current supply device VII is disconnected at step fourteen. Upon the taking of each photograph, a new exposure measurement and a new diaphragm setting takes place. The automatic resetting of the step-by-step switch from output fourteen to output zero is effected in the following manner: With the closing of the switch 31, the zero potential lies at the one input of the OR member 160 via the instantaneous-value input line 1. As a result of the fact that the release-lock is not connected and therefore as a result of the opened switch 37, the value 0 is present via the inverter 167 on the other input. In this way the output of the OR member has the value 0. Since the release is depressed, the inputs of the OR member 162 have the value 0 and thus also its output, and the inputs of the OR member 161 assume the value 0. In this way the inputs of the NOR member 147 also have the value 0 and thus the output has the value 1. Since the film-transport motor is no longer operating, the switch 41 is opened and the value 1 is present on the AND member 172 via the instantaneous-value input line 28. Since both inputs have the value 1, the output of the AND member 172 also has the value 1. In this way the output of the OR member 167 receives the value 1 and the output of the NOR member 130, the output of the AND member 131 and the output of the AND member 132 each receive the value 0 so that, as described at the start, the clear inputs of the counters A–D assume the value 0 and the step-by-step switch is reset to its output zero.

2.2. With the release unactuated, only the measurement button XVII is depressed.

The process proceeds in the manner described under Item 1. The step-by-step switch travels from step zero to step three and then jumps to step twelve where it remains, since pulse generator IIIa is disconnected via control line 19 — as described under 1 (exposure measurement). Only one measurement takes place. By suitable displacement of the time-setting device VI, the exposure measurement and the diaphragm setting can be repeated, as already stated. All details have already been described under 1 (exposure measurement).

2.3. With the measurement button XVII actuated, the release XVI is depressed.

If the output twelve of the step-by-step switch I is actuated and if, with the measurement button XVII actuated, the release XVI is depressed, then the step-by-step switch will be set back to step four via the present input of the counter D as soon as the film-transport motor XV stops. This takes place as a result of the fact that with the inserted switch 31, the output of the OR member 160 and thus an input of the OR member 161 receives the value 0. If by depressing the release XVI the switch 39 in FIG. 5 is now closed, then the value 0 is present, via the instantaneous-value input line 27, on the influenceable input of the OR member 162. With the value 0 of the output of the OR member 162, the other input of the OR member 161 has the value 0 and thus also its out is 0. In this way the output of the NAND member 169 has the value 1 independently of the value of the other input. The output of the AND member 170 thus has the value 1 since its other input also has the value 1 via NOR member 146. With the film-transport motor XV stopped and thus the switch 41 opened, both inputs of the NAND member 171 have the value 1 and thus its output has the value 0, as does the output of the AND member 131. The present input of the counter D receives the value 0, as a result of which the step-by-step switch I is placed at step four. If the release is still depressed here, then the step-by-step switch moves through all switch steps four, five, six . . . up to twelve. If the release XVI is already opened at step twelve, then the step-by-step switch stops, with disconnecting of the control-pulse generator IIIa via control line 19.

If the release XVI on step twelve is still not depressed, the above-described process is repeated until release and measurement button are freed. The step-by-step switch then travels past step twelve to step fourteen, where it disconnects the power supply VII. Upon serial-picture switching with depressed measurement button XVII and release XVI, the exposure of the individual photographic pictures therefore takes place with constant exposure time and diaphragm opening.

3. Disconnecting of the Automatic Diaphragm Mechanism

If it is desired to operate with manually adjustable diaphragm and time values, then the automatic diaphragm mechanism must be disconnected by closing the selector switch 30. In this case also the three subcases indicated under Item 2 must be distinguished between.

3.1. Only the release XVI is actuated.

By closing the switch 30, zero potential lies, via the instantaneous-value input line 2, at the input of the OR member 173. With actuation of the release, the step-by-step switch I is placed at step zero in the manner described above and the diaphragm closes to the manually adjusted diaphragm value, which is obtainable due to the fact that, for instance, a stop is adjusted in the path of displacement of the diaphragm drive X. After 10 msec, it is advanced to step one. In this way the other input of the member 173 also receives the value 0 so that the output of the OR member 173 assumes the value 0. In this way a signal zero is present both, via the AND member 132, at the clear inputs of the switch A and B and also at the present input of the counter C. In this way the step-by-step switch is moved immediately from step one to step four. The activating of step one is very short and amounts to only about 30 ns. In step four the shutter is closed and the exposure program proceeds in the manner described.

3.2 Only the measurement button XVII is actuated.

The process takes place in the same manner as described under 3.1: Upon actuation of the measurement button the step-by-step switch I is set at step zero, whereby the diaphragm is brought to the diaphragm value which has been set by hand. Thereupon the step-by-step switch is moved in the manner described to step one and directed to step four. The step-by-step switch, as already described under 1 (exposure measurement), remains in step four for only about 30 ns until it is recognized that the release XVI is not depressed and is immediately placed by the counter D at step twelve where it remains until the measurement button is liberated. In this way the voltage of the control-pulse generator IIIa at control line 19 stops and the step-by-step switch travels via step thirteen to fourteen where the current supply device VII is disconnected. All individual functions taking place in this connection have already been described above.

3.3. With the measurement button XVII actuated, release XVI is depressed. With the actuation of the measurement button, the step-by-step switch remains on step twelve, as described under 3.2. If the release XVI is now depressed, then, via the instantaneous-value input line 27, the OR member 162 and the inverter 168, a signal arrives at the input 43c of the flip-flop 43, so that the latter flips as described under 1 or 2.3. The further process proceeds in the same manner as above and the step-by-step switch I is reset by the counter D to step four. If the release XVI is still depressed at step four, then the step-by-step switch passes through all switch steps five to twelve, at which it is stopped with the measurement button XVI actuated. By again depressing the release XVI, the process can be repeated. If the measurement button XVII is liberated, then the step-by-step switch travels through to step fourteen and here — as described at the beginning under step fourteen — after the stopping of the film transport motor XV, disconnects the power supply VII via the control line 6.

4. Locking of Release

If it is desired to prevent pictures being taken under unfavorable light conditions for which no optimum diaphragm setting is possible in the camera, it is possible by closing a selector switch 37 for release locking to prevent the taking of a picture in case of threatened improper exposure after the diaphragm setting has been effected. After a short actuation of step four, the step-by-step switch immediately jumps to step twelve and remains there. The indicating device XI for improper time setting indicates to the photographer that he must change the time setting or the light conditions.

This is done in the following manner:

With the closing of the selector switch 37, the instantaneous-value input line 16 is connected with the collector of an NPN transistor 52 in FIG. 8. If, after the termination of the diaphragm setting on step three of the step-by-step switch, the indicating device XI indicates improper exposure, a current flows through the luminous diodes 93 or 94 via the resistor 53. The transistor 52 becomes conductive and the instantaneous-value input line 16 is at zero potential. A signal is produced at the output of the inverter 167 so that the output of the NOR member 163 assumes the value 0. In this way the one input of the OR member 164 has the value 0.

If the step-by-step switch is placed at step four, then the other input of the OR member 164 connected with the output four of the step-by-step switch receives the value 0 so that the output of the OR member 164 takes on the value 0. In this way the preset input of the counter D receives the value 0 and, as already described in detail under 1 (exposure measurement), the step-by-step switch is placed from step four directly onto step twelve. In this way the output twelve of the step-by-step switch receives the value 0. Since switch 37 is closed and switch 40 of the measurement button is opened and switch 39 of the release is closed, the following logical decision elements receive the following value:

| | |
|---|---|
| Output of OR member 162 | 0 |
| Output of inverter 168 | 1 |
| Output of inverter 167 | 1 |
| Output of NAND member 174 | 0 |
| Output of AND member 165 | 0 | and thus the input of the NOR member 146 has the value 0. At the output of the NOR member 146 a signal appears so that a signal also appears at the outputs of the OR members 148 and 149. In this way the output of the NOR member 145 has the value 0, as does the input of the NAND member 143. As a result there is produced at the output of the NAND member 143 a signal which, via the control line 19, disconnects the control-pulse generator IIIa in the manner already described.

In FIG. 2 there is shown essentially the same block diagram of an electronic process regulator for a still camera as in FIG. 1. In this case, however, instead of an automatic diaphragm setting mechanism IV, an automatic time-setting or shutter speed setting mechanism V is provided. The place of the time-setting device VI is taken by a diaphragm-setting device IX. The automatic time-setting mechanism, for a selected diaphragm aperture, measures the brightness of the object and converts it into an electric signal which controls a time-forming generator. Accordingly the time-forming generator IIIc can be done away with in this arrangement since it is already contained in the automatic time-setting mechanism V. The film speed and the diaphragm selection are introduced into the automatic time-setting mechanism V via the instantaneous-value input lines 32' and 33'. Instead of the preselected time or shutter speed, the preselected diaphragm aperture is fed via the instantaneous-value line 17' to the control and program part II. The actuating of the diaphragm control device XIX which in its turn actuates the diaphragm drive X takes place exclusively via the step-by-step switch I. Via the instantaneous-value input line 2' (selector switch 30), the automatic exposure mechanism can be disconnected via the control and program part II and manual setting is thus possible. The construction and manner of operation of the modified circuit arrangement shown in FIG. 2 is otherwise the same as described in connection with FIGS. 1, 3, 4, 5, 6 (control-pulse generator IIIa and IIIb), 7 (diaphragm control device XIX with diaphragm drive X), 8, 9, and 10.

Certain arrangements for making "serial" pictures in rapid sequence, without resetting the shutter speed or the diaphragm aperture, have been described above. Another feature of the present invention is the provision of still other serial picture arrangements, which may be regarded as supplemental to the serial picture arrangements already described. In particular, the supplemental serial picture mechanism now to be described enables the taking of a predetermined set number of serial exposures in rapid succession. Moreover, the serial picture arrangement now to be described, particularly with reference to FIGS. 11 and 12 of the drawings, is so designed that it may, if desired, be in the form of a separate unit which is simply plugged into appropriate connections of the main circuitry, without requiring any change in the main circuitry except for the provision of suitable plug-in connections.

This serial picture arrangement is so designed that it may be used either with the original form of electronic control means as disclosed in the parent application, Ser. No. 386,379, or with the control means disclosed in greater detail in the foregoing part of this present application. For the sake of simplicity, the serial picture arrangement will be described as applied to the original camera control means of the parent application Ser. No. 386,379. Those skilled in the art will readily understand, without further explanation, how it can be applied also to the control means disclosed above in the present application, since the control means of the present application is very closely similar to the control means in the parent application.

In the parent application, just as in the present case, the step-by-step switch advances from one step to the next, when the pulse generator delivers a pulse, and the various steps relate to the same functions as the steps described above in the present application.

Figure 11:
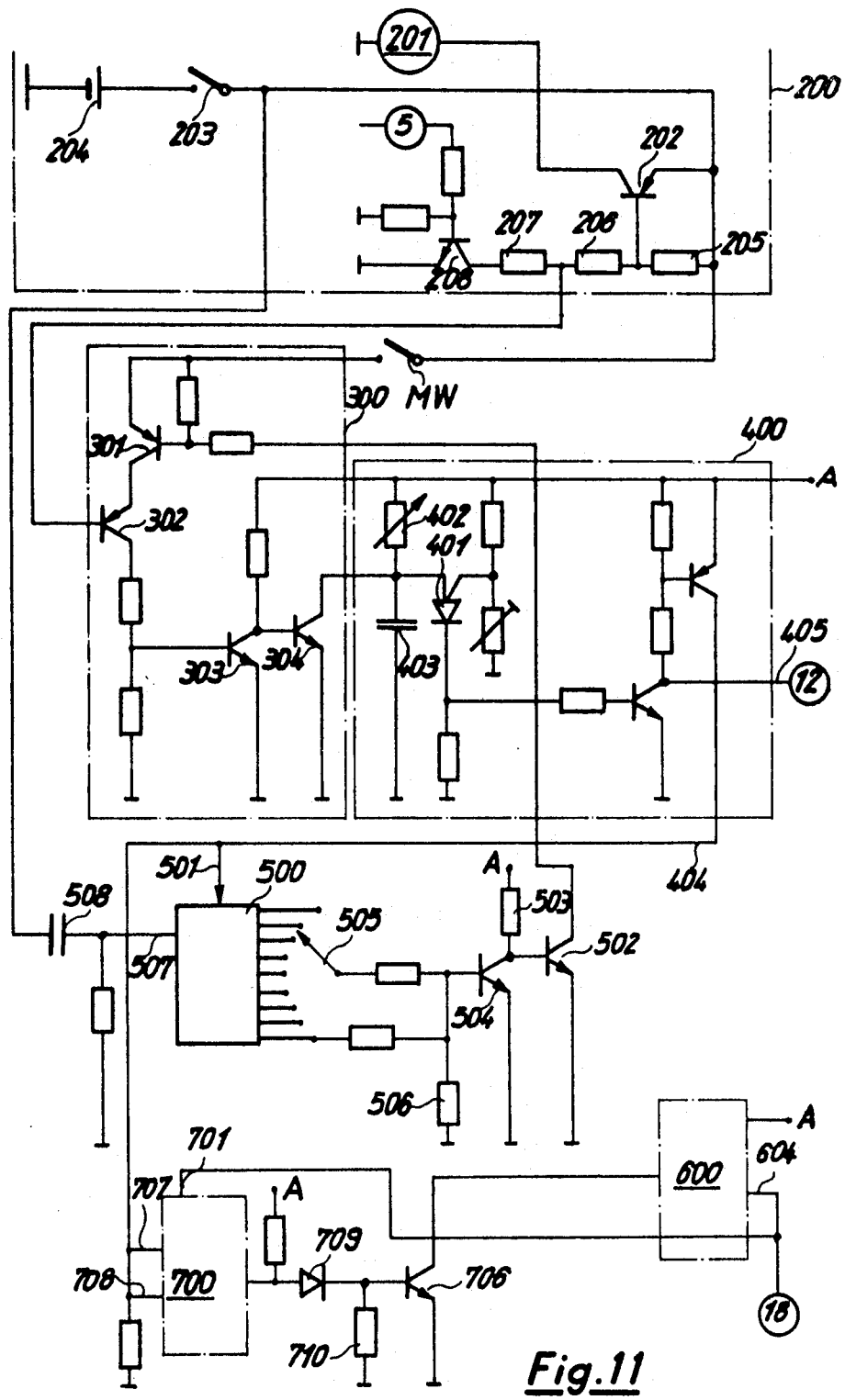
FIG. 11 is a wiring diagram illustrating supplementary circuit means optionally added to the basic circuits for enabling the taking of a series of pictures in rapid succession without changing or resetting the diaphragm aperture or the shutter speed.

Referring now to FIG. 11 of the present drawings, the parts at the top of this view, within the dot-dash outline labeled 200, represent parts already present in the control means of the parent application. The film transport motor is indicated schematically at 201, and is connected through a PNP transistor 202 and the camera switch 203, to the current supply battery 204 of the camera. The base of the transistor 202 is connected with a voltage divider comprising the resistors 205, 206, and 207. This voltage divider is connected in series with the collector-emitter path of an NPN transistor 208. The base of the transistor 208 is connected via the control line 5 with the output step 9 of the step-by-step switch schematically shown at I both in the parent application and in the present application. The control line 5 is the control line also designated by the same numeral 5 both in the parent application and in the foregoing part (FIGS. 1–9) of the present application.

Figure 12:
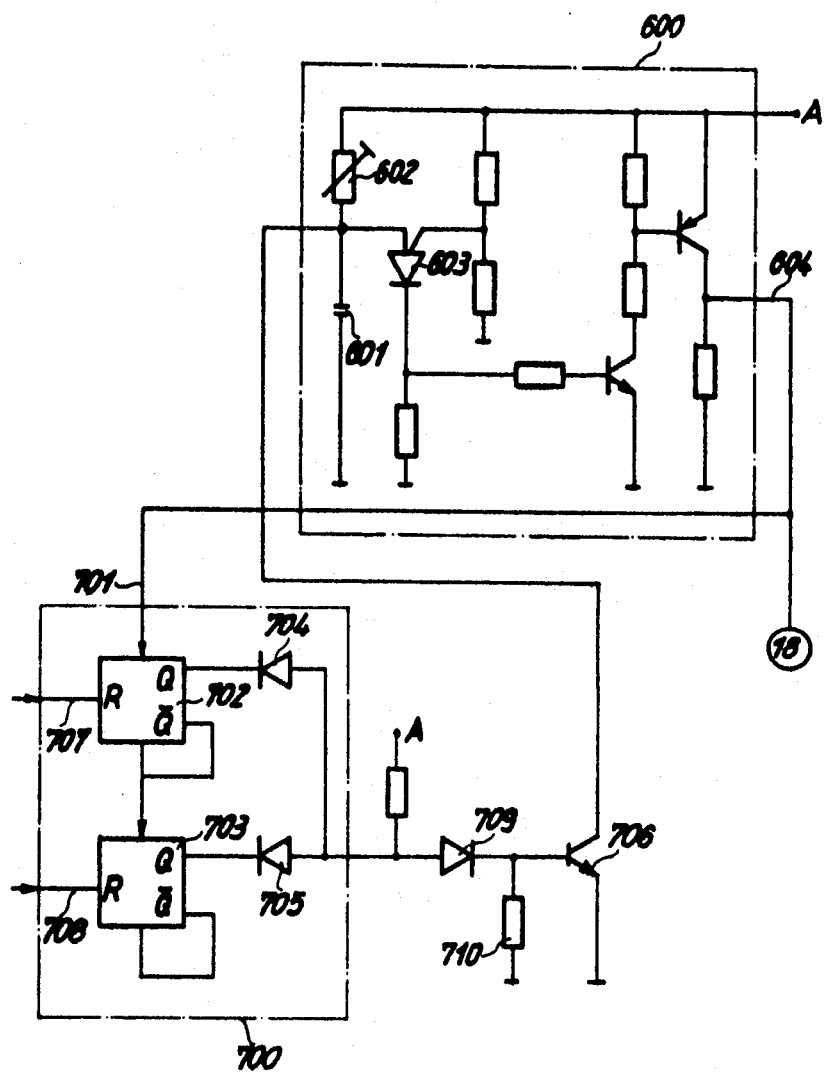
FIG. 12 is a wiring diagram illustrating further details of the supplementary circuit means of FIG. 11.

The circuit arrangement for the multi-exposure mechanism has switch means 300 for interrupting the course of the program after the actuation of the shutter into closed position effected via the output 8 of the step-by-step switch after the exposure has taken place, and a first pulse generator 400, a pulse counter 500, a second pulse generator 600, and a second pulse counter 700. The two pulse generators 400 and 600 are of identical construction and are known in the switching art. Referring now to FIG. 12 as well as FIG. 11, as time-forming elements these pulse generators have an RC member consisting of capacitors 401 and 601 respectively, and resistors 402 and 602 respectively. Upon reaching a given condition of charge, a programmable unijunction transistor (PUT) 403 and 603 respectively, is driven and a needle-shaped pulse occurs at the outputs 404 and 604 respectively and 405. The output 404 of the pulse generator 400 is connected with the clock input 501 of the first pulse counter, the output 405 with the control line 12 — and thus with the so-called master-clear input of the step-by-step switch I for resetting the step-by-step switch to its starting position — and the output 604 is connected on the one hand with the clock input 701 of the second pulse counter 700 and on the other hand via the control line 18 with the clock input of the step-by-step switch. The pulse generators are connected to the points A with the 5 volt stabilized battery voltage.

The switch means 300 have as essential component the series connection of a transistor 301 and a transistor 302, which circuit is connected via a multi-exposure selector switch MW to the current-supply battery 204 of the camera. The base of the transistor 301 is connected to zero potential via the collector-emitter path of another transistor 502. The base of the transistor 502 is connected via a resistor 503 with the stabilized 5 volt supply (A) and at the same time with the collector of another transistor 504 whose base can be actuated via the outputs of the pulse counter 500. The base of the transistor 302 is connected to the voltage divider 205, 206, 207 between the resistors 206 and 207. To its collector there is connected the base of another transistor 303 whose collector in its turn is connected to the base of a transistor 304 which is connected in parallel to the capacitor 401 of the first pulse generator 400.

The first pulse counter 400, of known construction, has a plurality of outputs which are actuated one after the other in accordance with the number of pulses arriving at the clock input. By means of a pulse-number setting device 505, the output which corresponds to the desired number of exposures is selected. This output is then connected via the pulse-number setting device 505 with the base of the transistor 504 which is furthermore connected via a resistor 506 with zero potential. The reset-zero or clear input 507 of the first pulse counter 500 is connected via a capacitor 508 with the camera switch 203. At the time of the connecting of the voltage supply of the camera, the connecting pulse which passes via the capacitor 508 to the input effects a return of the pulse counter to its zero or starting position.

The second pulse counter 700 consists of two flip-flops 702 and 703 connected in series, the outputs of which are connected via decoupling diodes 704 and 705 with the base of a transistor 706 which is connected in parallel to the pulse generator 600. The reset-zero or clear inputs 707 and 708 of the two flip-flops are connected with the output 404 of the first pulse generator.

The manner of operation of the circuit described is as follows: If the camera switch 203 is closed, the multi-exposure selector switch MW opened and the release pressed, the taking of the picture proceeds in the manner described in the parent application. It is assumed that the reader is sufficiently familiar with the operation of the control means of the parent application, the disclosure of which is incorporated herein by reference. The operation of the present serial picture or multi-exposure mechanism can also be understood from a knowledge of the control means described above in connection with FIGS. 1–10 of the present application, as this control means is sufficiently similar to the control means of the parent application so that reference to the disclosure of the parent application should not be necessary.

First of all, with actuation of the zero output, the control line 10 for the diaphragm-closing device receives a positive signal, so that the diaphragm is moved into closed position. Thereupon, with the actuation of the outputs one, two, and three — in which connection the corresponding signals are guided via the control ines 9, 7, and 23 to the camera parts — the diaphragm setting takes place corresponding to the prevailing light conditions. With the actuation of the output four, the camera shutter is closed. With the appearance of a signal at output five, the mirror is swung out of the viewing position into the picture-taking position. With a signal at output six, the shutter is opened, and with a signal at output seven, the film-exposure time set is called up via the time-forming generator. With the appearance of a signal at the output eight, the shutter is closed again via the control line 14, and with the appearance of a signal at the output nine, the film-transport motor 201 is connected via the control line 5, the motor returning the mirror into its viewing position and advancing the film by the space of one picture. The connecting of the film-transport motor 201 is effected in the manner that as a result of the occurrence of a positive pulse in the control line 5, the transistor 208 becomes conductive, so that the base of the PNP transistor 202 assumes a lower potential than its emitter, and the transistor 202 also becomes conductive, so that the battery is connected with the film-transport motor via the transistor 202.

If the multi-exposure selector switch MW is closed, then the emitter of the PNP transistor 301 is connected to the battery of the camera. Since the transistor 502 is always conductive upon the connection of the camera, the transistor 301 is opened. The transistor 304 and the transistor 706 are conductive, as can easily be noted from the drawing, so that the pulse generators 400 and 600 are short-circuited. With the depression of the camera release, the picture-taking process takes place in the manner described above until the step-by-step switch is placed at stage nine and in this way a positive pulse occurs in the control line 5 for the film-transport motor 201 and drives the transistor 208. The resistors 205, 206, and 207 are now dimensioned in such a manner that when the transistor 301 is conductive, while the transistor 302 is driven, the transistor 202 remains, however, in its blocked condition. When the transistor 302 becomes conductive, the transistor 303 also becomes conductive, whereby in its turn transistor 304 is brought into the blocked condition. In this way the short-circuit of the first pulse generator 400 is eliminated so that a positive pulse occurs at the output 405 and the output 404 of the pulse generator. This positive pulse is fed via the control line 12 to the so-called master-clear input of the step-by-step switch and effects a return of the step-by-step switch from output nine to output zero from where it is again placed by the control pulse generator III via the control line 18 at output one, two, etc., continuously up to output nine.

If a number of two similar exposures is set with the pulse-number setting device 500, then the second output of the pulse counter 500 is connected with the base of the transistor 504. The first positive pulse places the pulse counter at output one via the line 404 and the clock input 501. The exposure proceeds in the manner described and upon actuation of the output nine of the step-by-step switch, a pulse again occurs at the outputs of the pulse generator 400, which pulse again returns the step-by-step switch I via the control line 12 to the output zero and places the pulse counter 500 via the output 404 at output two. With the actuation of the output two of the pulse counter 500, the base of the transistor 504 is actuated with a positive pulse. In this way the transistor 504 becomes conductive and connects the base of the NPN transistor 502 to zero potential, so that the latter blocks. With the blocking of the transistor 502, the transistor 301 is also blocked. The process of the taking of the picture proceeds in customary fashion from actuation of the output zero of the step-by-step switch up to output nine of the step-by-step switch. With actuation of the output nine, the transistor 208, by becoming conductive, effects, in view of the blocked transistor 301, a driving of the transistor 202, so that the film-transport motor 201 is connected, while the pulse generator 400 remains short-circuited. The step-by-step switch I is advanced in accordance with the program described in the parent application (or as described in connection with FIGS. 1–10 of the present application), and finally, upon actuation of the output fourteen of the step-by-step switch, the current supply for the camera is disconnected. In this way the photographic cycle, when two exposures are completed, is brought to an end and the camera is again ready to take a picture.

Since the pulse generator III advances the step-by-step switch at a frequency of about 10 msec, a number of approximately 20 exposures per second is obtained by this circuit arrangement. By the addition of the second pulse generator 600, which has a substantially higher pulse frequency than the control pulse generator III, and of the second pulse counter 700, a multi-exposure frequency of more than 50 exposures per second can be obtained. In this connection, one proceeds from the consideration that an actuation of the outputs zero, one, two, three, four, and five for the duration of 10 msec each is not necessary, since the individual camera parts actuated at these outputs are, upon repetition of the exposure process, in any event already in the operating condition in which they are to be placed by actuation of the said outputs of the step-by-step switch.

Up to and including output six therefore the actuation of the individual outputs can take place with substantially higher frequency. The advancing pulses are suppled by the second pulse generator 600, it being so matched to the pulse counter 700 that it gives off 3 pulses in rapid sequence. With the first pulse the step-by-step switch which has been reset to output zero via the control line 12 is placed at output one. In the manner described in the parent application, and in the foregoing part (FIGS. 1-10) of the present application, with the automatic diaphragm mechanism disconnected, and therefore after the insertion of the switch present in the control line 2, with actuation of the output one, the control and program part immediately places the step-by-step switch I at output four.

Here the second pulse of the pulse generator 600 effects an advance to output five and the next pulse an advance to output six of the step-by-step switch I. Here once again the control pulse generator IIIa, IIIb, or the time-forming generator IIIc, as described above, takes over the advancing of the step-by-step switch to step nine. The second pulse generator 600 is short-circuited by a transistor 706 which is blocked with the appearance of a pulse at the output 404 of the first pulse generator 400. This takes place in the manner that the pulse at the output 404 of the pulse generator 400 resets the two flip-flops to their starting position via the reset-zero inputs of the two flip-flops 707 and 708, so that their two outputs Q assume the value logic zero. In this way the base of the transistor 706 is placed at zero potential via the resistor 710 and the transistor 706 blocks.

In this way the short-circuit of the capacitor 601 of the pulse-generator 600 is eliminated and 3 positive pulses appear in rapid sequence at the output 604. In addition to the actuating of the step-by-step switch I via the control line 18, the first pulse brings it about via the clock input 701 of the flip-flop 702 that the output Q of the first flip-flop receives the value logic one. The second pulse has the effect that the output Q of the first flip-flop 702 receives the value logic zero, the inverted output Q of the first flip-flop 702 the value logic one, and thus the output Q of the second flip-flop 703 the value logic one and the inverted output Q of the second flip-flop 703 the value logic zero. The third pulse has the result that the output of the first flip-flop 702 receives the value logic one, its inverted output the value logic zero, the output of the second flip-flop 703 the value logic one and its inverted output the value logic zero. A positive potential thus appears at the output of the counter 700, and the transistor 706 becomes conductive, since its base is now connected via the diode 709 with the 5 volt stabilizied battery voltage A. The transistor 706 remains conductive until a pulse again appears at the output 404 of the pulse generator 400 and resets the flip-flops via their reset-zero or clear inputs 707 and 708 to their starting position, i.e., the value logic zero appears at the outputs Q of the flip-flops. In this way the transistor 706 is again blocked and the pulse generator 600 can again give off 3 pulses in rapid sequence.

As a result of this circuit arrangement, the possibility is created of multi-exposures without the process controller in accordance with the parent application or with FIGS. 1-10 of the present application having to be changed or modified. The elements 300 to 700 of the circuit arrangement can therefore be combined in a single apparatus which can be plugged as an accessory to the corresponding electric contacts of the camera in accordance with the parent application or FIGS. 1-10 of the present application. The basic process controller can therefore be increased by a further variant of camera technique without any substantial change by simply adding the circuit arrangement as herein described in connection with FIGS. 11 and 12.

What is claimed is:

1. A photographic camera with electronic control means, comprising a central electronic process controller having:
   a. a step-by-step switch having a series of different step positions and a series of output connections corresponding to the respective step positions;
   b. means for providing an electric signal to an output connection corresponding to a given step position different from an electric signal then provided to output connections corresponding to other step positions;
   c. a control and program part;
   d. a plurality of individual camera elements including a shutter movable between closed and open positions, a diaphragm movable to various aperture positions, and operating means for said shutter and said diaphragm;
   e. means for introducing instantaneous values indicating operating conditions of various individual camera elements into said control and program part;
   f. feed-back means for feeding values from said control and program part into said step-by-step switch; and
   g. means for feeding electric signals from the respective output connections of said step-by-step switch to said individual camera elements.

2. A camera according to claim 1, characterized by a control-pulse generator (IIIa) which actuates said step-by-step switch (I) in such a manner that with each control pulse, said different signal is provided to the next following output connection of the step-by-step switch.

3. A camera according to claim 2, characterized by a second control-pulse generator (IIIb), a shutter control device (XIX), means connecting said second generator and said shutter control device to a common source of voltage, and means for rendering said connecting means effective by operation of said step-by-step switch (I) upon actuation of the shutter-control device effected via the control and program part (II) in order to open the shutter and which in its turn advances the step-by-step switch by one step.

4. A camera according to claim 3, characterized by means for disconnecting said first control-pulse generator (IIIa) on the switch step to which it has been advanced.

5. A camera according to claim 3, characterized by the fact that the time interval from the connecting of the control-pulse generator (IIIb) until the giving off of the first control pulse corresponds to the time which is necessary for the shutter to pass from a closed position into an open position.

6. A camera according to claim 3, characterized by the fact that every possible train of pulses from the second control-pulse generator (IIIb) is smaller than the train of pulses from the first control-pulse generator (IIIa).

7. A camera according to claim 2, characterized by the fact that the control-pulse generator (IIIa) can be connected and disconnected as desired through the control and program part (II).

8. A camera according to claim 1, characterized by the fact that the step-by-step switch (I) has inputs through which its output connections can be provided with said different electric signal by said control and program part (II) in any desired sequence.

9. A camera according to claim 1, characterized by a time setting device (VI), and a time-forming generator (IIIc) into which a selectable exposure time can be introduced by means of said time-setting device (VI).

10. A camera according to claim 9, characterized by means for activating said time-forming generator (IIIc) by an output signal from a given output step (seven) of said step-by-step switch (I), and means for producing simultaneous blocking of the control pulse generator (IIa), and means for advancing said step-by-step switch by one step after a period of time corresponding to the exposure time set.

11. A camera according to claim 1, characterized by a diaphragm control device (XIX), an automatic diaphragm setting mechanism (IV), and means for actuating said diphragm control device either by said automatic diaphragm setting mechanism or by said step-by-step switch (I).

12. A camera according to claim 11, characterized by the fact that the automatic diaphragm-setting mechanism (IV) contains a light-measuring device (71, 72, 73) and an arrangement (75, 76, 77, 78) for converting the measured value into an electric signal, and means for feeding such signal directly to the diaphragm control device (XIX).

13. A camera according to claim 12, characterized by the fact that a film speed setting and a selected exposure time setting can be introduced directly into said light-measuring device (73).

14. A camera according to claim 11, characterized by the fact that said diaphragm control device (XIX) comprises an NPN transistor and a PNP transistor (83, 84) connected in series with each other, their bases being connected together and their emitters being connected via a diaphragm drive (X) to half the voltage present between the collector of the NPN transistor (83) and the collector of the PNP transistor (84).

15. A camera according to claim 11, characterized by the fact that said automatic diaphragm setting mechanism (IV) contains means (74, 92) for measuring the stray light which impinges, with the lens diaphragm (70) closed, on a photoelement (71) of the light-measuring device which is arranged behind the lens diaphragm.

16. A camera according to claim 11 characterized by the fact that said diaphragm control device (XIX) can be actuated directly from the step-by-step switch (I).

17. A camera according to claim 1, characterized by an automatic shutter speed time-setting mechanism (V) responsive to settings of film-speed and diaphragm aperture and responsive to the brightness of the object to be photographed, for determining the exposure time which can be obtained via a control line (8') from the step-by-step switch (I).

18. A camera according to claim 1, characterized by a camera release (XVI), a measurement button (XVII), a power supply device (VII), and means for operatively connecting said power supply to said control and program part upon actuation of either said release or said measurement button.

19. A camera according to claim 1, characterized by means for selecting a program for a given photographic exposure a power supply device (VII), and means effective upon the completion of the course of the program selected and effective through said control and program part (II) for disconnecting said power supply device.

20. A camera according to claim 1, characterized by a shutter control device (XII), means for calling up an exposure time, and a monoflop (35) which in its metastable condition causes the shutter-control device (XII) to open the shutter, said monoflop being adapted to be activated via the step-by-step switch (I) before the calling-up of the exposure time.

21. A camera according to claim 20, characterized by the fact that said monoflop (35) after the calling-up of the exposure time can be returned into its stable condition with actuation of the shutter-control device (XII) for the closing of the shutter via the step-by-step switch (I).

22. A camera according to claim 1, further comprising a measurement button (XVII), a release (XVI), and an indicating device (XI) which, after the pressing of said measurement button (XVII) or said release (XVI), signals the fact to the operator that the exposure values are not sufficient.

23. A camera according to claim 1, characterized by a depressable measurement button (XVII), and means responsive to depression of the measurement button for advancing said step-by-step switch (I) from its starting position (zero) step by step until the completion of the setting of the diaphragm and for stopping said switch in a further switch step (twelve).

24. A camera according to claim 23, wherein said step-by-step switch includes a counter (D), said camera further comprising a shutter control device (XII), and a first control pulse generator (IIIa), and means for setting said step-by-step switch (I) directly on a further switch step of higher number (twelve) by means of said control and program part (II) via a preset input of said counter (D) upon actuation of its output (four) connected with said shutter-control device (XII) for the closing of the shutter, in which high switch step the first control-pulse generator (IIIa) can be disconnected via the control and program part.

25. A camera according to claim 24, further comprising a release (XII), characterized by means responsive to actuation of said release for setting said step-by-step switch (I), when it has stopped on the further switch step (twelve), back to the step (four) which connects the shutter-control device (XII) for the closing of the shutter.

26. A camera according to claim 25, characterized by the fact that the control and program part (II) contains an additional flip-flop (43) which, upon actuation of the said switch step (twelve) of the step-by-step switch (I), is set via logical decision elements (146, 165) and can be reset by a pulse produced upon actuation of the release (XVI), its inverted output (rea), via logical decision elements (169, 170, 171, 131), actuating the clear input of one of the counters (D) of the step-by-step switch.

27. A camera according to claim 23, wherein said step-by-step switch includes a plurality of counters (A, B, C, D), said camera further comprising an exposure factor setting device (VI or IX), characterized by means for resetting said step-by-step switch (I) from a higher switch step (twelve) to its starting position (zero) by means of said control and program part (II) via the clear inputs of its said counters (A, B, C, D) as soon as said exposure factor setting device (VI or IX) is displaced.

28. A camera according to claim 27, characterized by the fact that the control and program part (II) has a flip-flop (42) which is set by a signal from an output at said switch step (twelve) of the step-by-step switch (I) via logical decision elements (174, 175, 146), and means for resetting said flip-flop by a pulse produced upon displacement of said exposure factor setting device (VI or IX) its non-inverted output (42a) actuating via logical decisison elements (167, 130, 131, 132) the clear inputs of the counters (A, B, C. D) of the step-by-step switch.

29. A camera according to claim 1, further comprising a depressable measurement button (XVII), a release (XVI), means activated by depression of said button for measuring an exposure factor in accordance with prevailing light conditions, and means effective upon actuation of said release while said measurement button is depressed for performing an exposure process with the exposure factor set to the value determined in the measurement process.

30. A camera according to claim 1, further comprising a selector switch (31) for serial-picture switching, a release (XII), and means responsive to actuation of both said selector switch and said release for producing a continuous repetition of the course of program for the taking of pictures as long as the release is actuated.

31. A camera according to claim 30, wherein said camera includes a film transport motor (XV) and said step-by-step switch (I) includes a plurality of counters (A, B, C, D), characterized by the fact that the step-by-step switch (I), after the stopping of the film-transport motor (XV), can be reset into its starting position via the clear inputs of its counters (A, B, C, D).

32. A camera according to claim 30, characterized by the fact that the continuous repetition of the course of the program of the taking of pictures, with said selector switch (31) operative, takes place without change of the initially determined diaphragm and exposure values as long as said release (XVI) and said measurement button (XVII) remain actuated.

33. A camera according to claim 32, further comprising a film transport motor (SV) which may be started and stopped, a shutter control device (XIII) for closing a shutter, a plurality of counters for said step-by-step switch, and means for resetting said step-by-step switch (I), after the stopping of said film-transport motor (XV), by means of said control and program part (II) via a clear input of one of said counters (D) to a switch step (four) which activates said shutter-control device (XII) for the closing of the shutter.

34. A camera according to claim 33, further comprising a depressable measurement button (XVII), a film transport motor (XV) which may be started and stopped, and a control pulse generator (IIIa) characterized by the fact that with the selector switch (31) for serial-picture switching connected, with the measurement button (XVII) depressed, and with the release (XVI) depressed, the logical decision elements (146, 165, 160, 161, 162, 169, 170, 171, 131) of the control and program part (II) are so connected that with the setting of the step-by-step switch (I) from its switch step (ten) which effects the opening of the shutter to the next switch step (twelve), the control-pulse generator (IIIa) is disconnected when the film-transport motor (XV) is operating and the clear input of one of the counters (D) of the step-by-step switch is actuated when the film-transport motor is stopped.

35. A camera according to claim 1, further comprising a selector switch (30), automatic exposure factor setting mechanism (IV or V), and means responsive to said selector switch (30) for disconnecting said automatic setting mechanism so that an exposure factor can be set by hand.

36. A camera according to claim 35, further comprising a plurality of counters associated with said step-by-step switch, a shutter control device (XII) for closing a shutter, a diaphragm control device (XIX) for closing a diaphragm, an output connection from a step (one) of said step-by-step switch to said diaphragm control device, and output connection from another step (four) of said step-by-step switch to said shutter control device, and means response to a preset input of one of said counters (C) for setting said step-by-step switch immediately on the step (four) which connects the shutter-control device (XII) for the closing of the shutter, as soon as its output (one) which is connected with the diaphragm-control device (XIX) for the closing of the diaphragm has received a signal.

37. A camera according to claim 1, further comprising a selector switch (37) for release-locking, an automatic diaphragm setting mechanism (IV), and means responsive to said selector switch for interrupting the course of an exposure program, in case of threatened incorrect exposure, after the termination of actuation of said automatic diaphragm setting mechanism (IV).

38. A camera according to claim 37, further comprising a shutter control device (XII) for closing of a shutter, an output connection from a step (four) of said step-by-step switch to said shutter control device, a plurality of counters (A, B, C, D) associated with said step-by-step switch, a first control-pulse generator (IIIa), and means responsive to a preset input of one of said counters (D) when said step-by-step switch is on that one of its steps (four) connected to said shutter control device for advancing said step-by-step switch directly to another switch step (twelve) effective to disconnect said first pulse generator.

39. A camera according to claim 37, further comprising means responsive to resetting an exposure factor to a value sufficient for the exposure, for rendering the release-locking ineffective.

40. A camera according to claim 37, further comprising an indicating device (XI) for indicating an improper selected exposure factor, and means deriving a control signal for release locking from said indicating device.

41. A camera according to claim 1, further comprising switch means for interrupting the course of a picture taking program other wise controlled by said control and program part at a point in such program after the closing of said shutter to terminate an individual exposure, an additional controller, and means for operatively connecting said additional controller to said control and program part, said additional controller when operatively connected serving to effect a determinable number of repetitions of the film exposure cycle without change in the exposure values of shutter speed and diaphragm aperture as initially set before the first exposure.

42. A camera according to claim 41, wherein said additional controller has means for eliminating the interruption of the course of the program after a predeterminable number of repetitions of the film exposure cycle.

43. A camera according to claim 41, wherein said additional controller, after interruption of the course of the program of the taking of a picture, is actuated via the step-by-step switch.

44. A camera according to claim 43, further including a film transport motor (XV or 201), an output connection (5) from one of the steps (nine) of said step-by-step switch to said motor, and means including said switch means for connecting said additional controller to said output connection (5) which connects the step-by-step switch with said film transport motor.

45. A camera according to claim 43, further comprising means responsive to said additional controller for resetting said step-by-step switch to a program-commencement position.

46. A camera according to claim 45, further comprising a "master-clear" input for said control and program part, and means connecting an output of the additional controller with the "master-clear" input of said control and program part.

47. A camera according to claim 41, further including means for preselecting a "multi-exposure" program, and means for rendering effective said switch means for interrupting the course of a program when said "multi-exposure" program has been preselected.

48. A camera according to claim 41, characterized by the fact that said additonal controller has a pulse generator (400) operable during actuation by the step-by-step switch, and a pulse counter (500) provided with a plurality of outputs successively actuated one after another, corresponding to the number of pulses provided by said pulse generator.

49. A camera according to claim 48, comprising means responsive to an output of said pulse counter (500) for disconnecting said switch means upon completion of a desired number of pulses for which said pulse counter has been set.

50. A camera according to claim 49, characterized by the fact that the pulse generator (400) can be disconnected simultaneously via said output of said pulse counter (500).

51. A camera according to claim 48, including means for preselecting a "multi-exposure" program, and a film transport control line (5), characterized by the fact that said switch means for interrupting the course of the program includes two series-connected transistors (301, 302), a connection via a multi-exposure selector switch (MW) to a current supply (VII or 204), and circuit means so arranged that with the multi-exposure program connected and the multi-exposure selector switch operative, said first mentioned transistor (301) is blocked via the output of said pulse-counter, and the second mentioned transistor (302) is driven via said film transport control line (5).

52. A camera according to calim 51, characterized by means for eliminating the interruption of the course of the program and for short circuiting the pulse generator (400), said last named means being operable when said first mentioned transistor is blocked.

53. A camera accoridng to claim 48, further comprising a "master-clear" input for said control and program part, said pulse generator (400) having an output connected with said "master-clear" input and also connected with a clock input (501) of said pulse counter (500), siad counter having a reset-zero input (507) connected via a capacitor (508) to a current supply siwtch (203) of the camera.

54. A camera according to claim 48, characterized by the fact that said additional controller has a second pulse generator (600) whose output is connected with a clock input (18) of said step-by-step switch, said second generator giving off in rapid sequence a number of pulses corresponding to the switch steps to be passed through by the step-by-step switch from the beginning of the course of the program for the taking of a picture until the actuation of said shutter operating means for opening said shutter for the starting of the exposure of the film.

55. A camera according to claim 54, further including a second pulse counter (700), said second pulse generator (600) being operatively connected by a pulse given off by said first pulse generator (400), and being operatively disconnected by a pulse given off by said second pulse counter (700) after a required number of pulses has been given off.

56. A camera according to claim 55, further comprising a transistor (706) is connected in parallel to said second pulse generator (600), the base of said transistor being adapted to be actuated by an output of said second pulse counter (700) which corresponds to the number of pulses to be given off, a clock input (701) of said second pulse counter being connected with the output of the second pulse generator, and a reset-zero input (707, 708) of said second pulse counter being connected with an output (404) of said first pulse generator (400).

57. A camera according to claim 41, characterized by the fact that said switch means for the interruption of the course of the program of said additional controller are combined in a component adapted to be electrically connected detachably to said control and program part by plugging said component into said part.

58. Photographic camera control means for controlling electronically the sequence and timing of the functions of setting one of two variable exposure value factors of an associated photographic camera, opening a shutter to start an exposure, and closing the shutter to terminate the exposure, input means for feeding into said assembly values participating in the proper selection of an exposure value factor to be set, and output means from said assembly for setting said variable exposure value factor and for opening said shutter and closing said shutter, said control means including pulse generating means, said output means including a plurality of electronic logic circuits, said assembly including step-by-step switching means operated by said pulse generating means, said switching means activating successively one after another of said electronic logic circuits, and manually controlled electric circuit means selectively operable to cause said step-by-step switching means to progress successively through a complete operative cycle of steps or to progress through only a selected number of such steps, omitting others.

59. Photographic camera control means for controlling electronically the sequence and timing of the functions of setting one of two variable exposure value factors of an associated photographic camera, opening a shutter to start an exposure, and closing the shutter to terminate the exposure, said control means comprising a program control assembly, input means for feeding into said assembly values participating in the proper selection of an exposure value factor to be set, and output means from said assembly for setting said variable exposure value factor and for opening said shutter and closing said shutter, said control means including pulse generating means, said output means including a plurality of electronic logic circuits, said assembly including step-by-step switching means operated by said pulse generating means, said switching means activating successively one after another of said electronic logic circuits, and means for resetting said step-by-step switching means to a previous step in its series of steps when a measurement circuit is activated during a time when the diaphragm aperture and shutter speed of the associated camera are set at values which are improper with relation to the prevailing illumination of a subject to be photographed.

60. Photographic camera control means for controlling electronically the sequence and timing of the functions of setting one of two variable exposure value factors of an associated photographic camera, opening a shutter to start an exposure, and closing the shutter to terminate the exposure, said control means comprising a program control assembly, input means for feeding into said assembly values participating in the proper selection of an exposure value factor to be set, and output means from said assembly for setting said variable exposure value factor and for opening said shutter and closing said shutter, said control means including pulse generating means, said output means including a plurality of electronic logic circuits, said assembly including step-by-step switching means operated by said pulse generating means, said switching means activating successively one after another of said electronic logic circuits, further comprising a winding for opening said shutter, and a circuit arrangement including a monoflop for supplying current to said winding to open said shutter, said circuit arrangement being so formed that it supplies current to said winding to open said shutter only for a specific time which does not over-stress said winding.

61. Photographic camera control means comprising:

(a) a plurality of electronic logic circuits for controlling the following operating functions of a camera associated with the control means, viz:
  (1) closing an auxiliary shutter,
  (2) lowering a relfex mirror,
  (3) opening a main shutter,
  (4) setting an exposure factor in accordance with the brightness of light entering through the open main shutter,
  (5) closing the main shutter,
  (6) raising the reflex mirror,
  (7) opening the auxiliary shutter,
  (8) opening the main shutter to start an exposure interval,
  (9) closing the main shutter to terminate the exposure interval, and
  (10) operating a film winding motor;
(b) impulse generating means;
(c) step-by-step switching means receiving pulses from said impulse generating means and supplying impulses to selected ones of said logic circuits;
(d) program control means responsive to certain of said logic circuits for controlling said impulse generating means and said step-by-step switching means;
(e) first manual switch means effective to initiate action of said program control means to run through a full cycle to perform all of said functions; and
(f) second manual switch means effective to cause said program control means to run through a partial cycle to perform only a selected part of said functions without performing others.

* * * * *